US008185821B2

(12) United States Patent  (10) Patent No.: US 8,185,821 B2
Sako et al.  (45) Date of Patent: May 22, 2012

(54) TABLE GENERATING METHOD, INFORMATION PROCESSING APPARATUS, AND RECORDING MEDIUM HAVING RECORDED TABLE GENERATING PROGRAM THEREON

(75) Inventors: Yoichiro Sako, Tokyo (JP); Mitsuru Takehara, Tokyo (JP); Yuichi Abe, Tokyo (JP); Takatoshi Nakamura, Ibaraki (JP); Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 968 days.

(21) Appl. No.: 11/890,175

(22) Filed: Aug. 3, 2007

(65) Prior Publication Data

US 2008/0032269 A1  Feb. 7, 2008

(30) Foreign Application Priority Data

Aug. 7, 2006 (JP) .................. 2006-214675

(51) Int. Cl.
*G06F 17/00* (2006.01)
(52) U.S. Cl. ............ 715/273; 715/733; 345/473
(58) Field of Classification Search .......... 715/273, 715/203, 214; 707/741; 705/8
See application file for complete search history.

(56) References Cited

U.S. PATENT DOCUMENTS

| 2001/0003186 A1* | 6/2001 | DeStefano .............. 707/526 |
| 2003/0074373 A1* | 4/2003 | Kaburagi et al. ....... 707/104.1 |
| 2005/0081146 A1* | 4/2005 | Tanaka et al. .......... 715/517 |
| 2007/0271263 A1* | 11/2007 | Merrild .................. 707/6 |

FOREIGN PATENT DOCUMENTS

| EP | 0 939 378 A3 | 6/2002 |
| JP | 11-066049 | 3/1999 |
| JP | 11-249640 | 9/1999 |
| JP | 2001-290913 A | 10/2001 |

OTHER PUBLICATIONS

Yoda, Akihiro et al., "Community Space System" for Regional Community Activation, 1998, pp. 73-76, vol. 80, No. 4, Hitachi Hyoronsha, Japan, 1998; REF. 715089.
Hayashi, Yoshio, "About Distribution and Use of Chronological Table Data Based on XML1", The Collection of the 67th Times (Heisei 17), National Conference Lecture Papers, Japan, Information Processing Society of Japan, Mar. 2, 2005, pp. 4-375 to 4-376; REF. 715088.
Japanese No. 0690347903 Ref 715087 year 2006 total 7 pages.
JP 0690347903 English Version in P.3 explaining/dated REF. 715089;715088.

* cited by examiner

*Primary Examiner* — Amelia Rutledge
*Assistant Examiner* — Quoc A Tran
(74) *Attorney, Agent, or Firm* — Wolf, Greenfield & Sacks, P.C.

(57) ABSTRACT

A method of generating a table in which data having time or period information is laid out at corresponding positions along a chronological axis includes the steps of displaying a table generating screen including a table generating area; displaying the chronological axis in the table generating area; obtaining a plurality of pieces of the data according to a selecting instruction; and generating the table by laying out the plurality of pieces of the data in the table generating area along the chronological axis on the basis of the time or period information of the individual pieces of the data.

17 Claims, 24 Drawing Sheets

TABLE GENERATING METHOD, INFORMATION PROCESSING APPARATUS, AND RECORDING MEDIUM HAVING RECORDED TABLE GENERATING PROGRAM THEREON

CROSS REFERENCES TO RELATED APPLICATIONS

The present invention contains subject matter related to Japanese Patent Application JP 2006-214675 filed in the Japanese Patent Office on Aug. 7, 2006, the entire contents of which are incorporated herein by reference.

BACKGROUND OF THE INVENTION

1. Field of the Invention

The present invention relates to a method and a system for generating a table showing events relating to a certain time or period on corresponding time or period positions along a chronological axis, such as a chronological table.

2. Description of the Related Art

Techniques for representing historical or past events in the form of chronological-table data and displaying the events in the form of a chronological table have been proposed. For example, it has been proposed to a chronological table showing Japanese history and world history or social background and company history in comparison with each other.

For example, according to techniques described in Japanese Unexamined Patent Application Publication No. 11-249640, a history of a user from the birth to the current time is displayed as divided into periods of several years, such as a period from the age of 0 to the age of 4, a period from the age of 5 to the age of 9, and a period from the age of 10 to the age of 14, according to chronological data including pairs of date and time data and event data.

According to techniques described in Japanese Unexamined Patent Application Publication No. 2001-290913, suitable information is extracted from base materials to generate article data and the article data is registered in an article database. Then, a base chronological table is generated on the basis of the article data, and tentative table-of-contents codes are assigned to individual articles on the basis of the base chronological table to generate a tentative table of contents. Furthermore, article data is extracted from the article database on the basis of the tentative table-of-contents codes, and the style of the article data is changed to a style of main text. Furthermore, pictures or graphics associated with the main text are extracted from the article database to generate a visual document. A chronological history is generated through the series of steps described above.

According to techniques described in Japanese Unexamined Patent Application Publication No. 11-66049, at a server connected to a user terminal via a network, upon receiving a chronological-table display request from the user terminal, personal history information of a user at the source of the request is read from a personal event database, history information is read from a history event database, and data for displaying a chronological table showing the personal history information and the history information in association with each other is generated and sent to the user terminal at the source of the request.

SUMMARY OF THE INVENTION

However, according to the techniques described in Japanese Unexamined Patent Application Publication No. 11-249640 or Japanese Unexamined Patent Application Publication No. 2001-290913, since entire chronological-table data is generated after generating data of individual events or articles, the user should perform a large amount of operations or inputs to generate a preferred or desired chronological table, particularly to create an array of a plurality of chronological tables.

In the case of the techniques described in Japanese Unexamined Patent Application Publication No. 11-66049, although it is possible to generate and display a chronological table in which a personal history of the user and a history common to all users are laid out in association with each other, it is not possible to generate and display a chronological table preferred or desired by the user.

It is desired that it is readily possible to generate a multiple chronological table for any application by combining chronological tables as desired, and to flexibly replace some chronological tables, rearrange chronological tables, change the display width of each chronological table, or the like. This serves to edit each chronological table so that the chronological table is easier to view and use, so that a user can enjoy the chronological table in various manners.

According to an embodiment of the present invention, there is provided a method of generating a table in which data having time or period information is laid out at corresponding positions along a chronological axis. The method includes the steps of displaying a table generating screen including a table generating area; displaying the chronological axis in the table generating area; obtaining a plurality of pieces of the data according to a selecting instruction; and generating the table by laying out the plurality of pieces of the data in the table generating area along the chronological axis on the basis of the time or period information of the individual pieces of the data.

With the table generation method described above, when the table that is generated is a chronological table, a user can obtain a multiple chronological table for any application along the same chronological axis simply by selecting a plurality of pieces of chronological-table data as desired from various chronological-table data existing or an external network such as the Internet or existing locally.

Furthermore, the plurality of chronological tables constituting the multiple chronological table are laid out in separate regions formed by dividing a chronological-table generating area of a chronological-table generating screen in the horizontal direction or vertical direction of the screen. Thus, it is possible to flexibly replace some chronological tables, rearrange chronological tables, change the display width of each chronological table, or the like. This serves to edit each chronological table so that the chronological table is easier to view and use, so that the user can enjoy the chronological table in various manners.

As described above, according to the embodiment of the present invention, it is readily possible to generate a multiple chronological table for any application by combining chronological tables as desired, and to flexibly replace some chronological tables, rearrange chronological tables, change the display width of each chronological table, or the like. This serves to edit each chronological table so that the chronological table is easier to view and use, so that a user can enjoy the chronological table in various manners.

DESCRIPTION OF THE PREFERRED EMBODIMENTS

1. System Configuration (FIG. 1)

Figure 1:
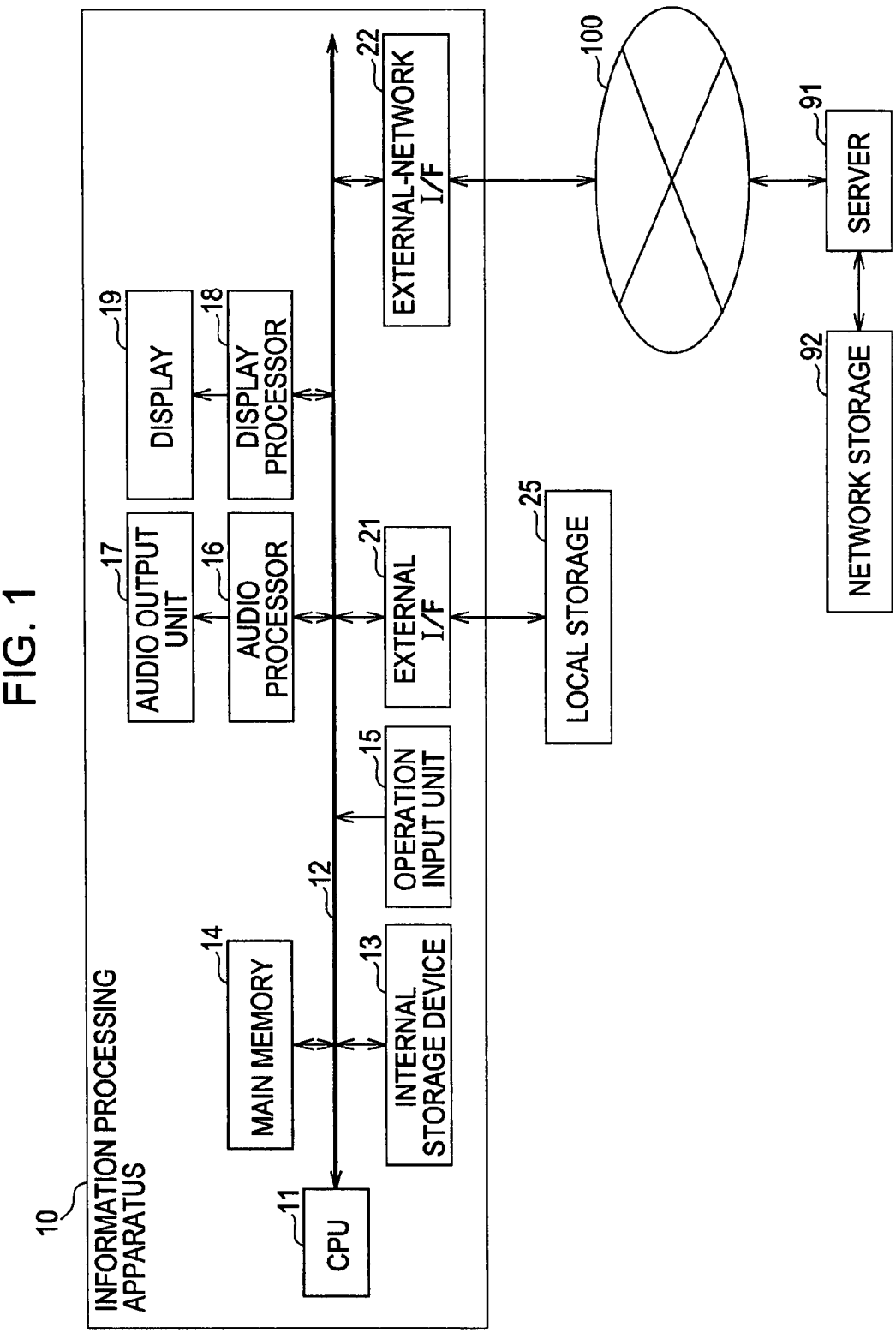
FIG. 1 is a diagram showing a system according to an embodiment of the present invention.

FIG. 1 shows an example of a system for generating a multiple chronological table by a method according to an embodiment of the present invention.

In the system of this example, an information processing apparatus 10 on a user's side is connected to a server 91 via the Internet 100.

The information processing apparatus 10 has functions of processing information and connecting to the Internet 100, and also has functions of playing back music according to music data and playing back images according to image data.

More specifically, the information processing apparatus 10 includes a central processing unit (CPU) 10, and an internal storage device 13 and a main memory 14 are connected to a bus 12 thereof. The internal storage device 13 is a storage device, such as a hard disk, that stores various programs including a program for generating a chronological table, and data such as various types of content data and chronological table data. The main memory 14 is a device in which the programs and data are loaded.

Furthermore, the bus 12 is connected to an operation input unit 15, is connected to an audio output unit 17 via an audio processor 16, and is connected to a display 19 via a display processor 18.

The audio processor 16 decodes audio data, such as music data. The audio output unit 17 includes an audio amplifying circuit and a speaker (a headphone). The display processor 18 decodes image data or screen data. The display 19 is a liquid crystal display, an organic electroluminescence (EL) display, or the like that displays images or screens.

Furthermore, the bus 12 is connected to an external interface 21 for connecting to an external local storage 25, and an external network interface 22 for connecting to the Internet 100.

The local storage 25 stores data such as various types of content data and chronological table data. The information processing apparatus 10 retrieves such data from the local storage 25.

The server 91 provides various types of chronological tables, content, and so forth as Web services on a Web site, and sends data such as chronological table data or content data to the information processing apparatus 10 in response to requests from the information processing apparatus 10. The server 91 is connected to a network storage 92 that stores data such as various types of chronological table data and content data.

2. Method of Generating Chronological Table (FIGS. 2 to 24)

In the system of the example shown in FIG. 1, the information processing apparatus 10 generates a vertical-display horizontal-array multiple chronological table or a horizontal-display vertical-array multiple chronological table.

In a vertical-display horizontal-array multiple chronological table, a chronological axis is represented along the vertical direction of a screen, chronological events are arrayed in the vertical direction of the screen, and a plurality of chronological tables are arrayed in the horizontal direction of the screen, as shown in FIGS. 2 to 10. On the other hand, in a horizontal-display vertical-array multiple chronological table, a chronological axis is represented along the horizontal direction of a screen, chronological events are arrayed in the horizontal direction of the screen, and a plurality of chronological tables are arrayed in the vertical direction of the screen.

Regardless of whether vertical-display horizontal-array or horizontal-display vertical-array, texts or phrases describing individual chronological events are preferably written horizontally when in English, and are preferably written horizontally also when in Japanese although vertical writing is also possible.

Chronological table data from which a multiple chronological table is generated may exist on an external network or locally. In an embodiment described below, a case where a multiple chronological table is generated from chronological table data existing on a local network, i.e., chronological table data stored on the network storage 92 on the side of the server 91 and provided via a Web site in the case of the example shown in FIG. 1, will be mainly described. A case where a multiple chronological table is generated from chronological table data existing locally, i.e., chronological table data stored in the internal storage device 13 or the local storage 25 in the case of the example shown in FIG. 1, will be described later as an alternative embodiment.

The following also describes editing of a multiple chronological table, which is a step of generation of the multiple chronological table as will be understood from the following description.

2-1. Generation of a Vertical-Display Horizontal-Array Multiple Chronological Table (FIGS. 2 to 9)

When a user wishes to generate a multiple chronological table, the user activates a Web browser and accesses the Web site mentioned earlier by an operation of the operation input unit 15.

Figure 2:
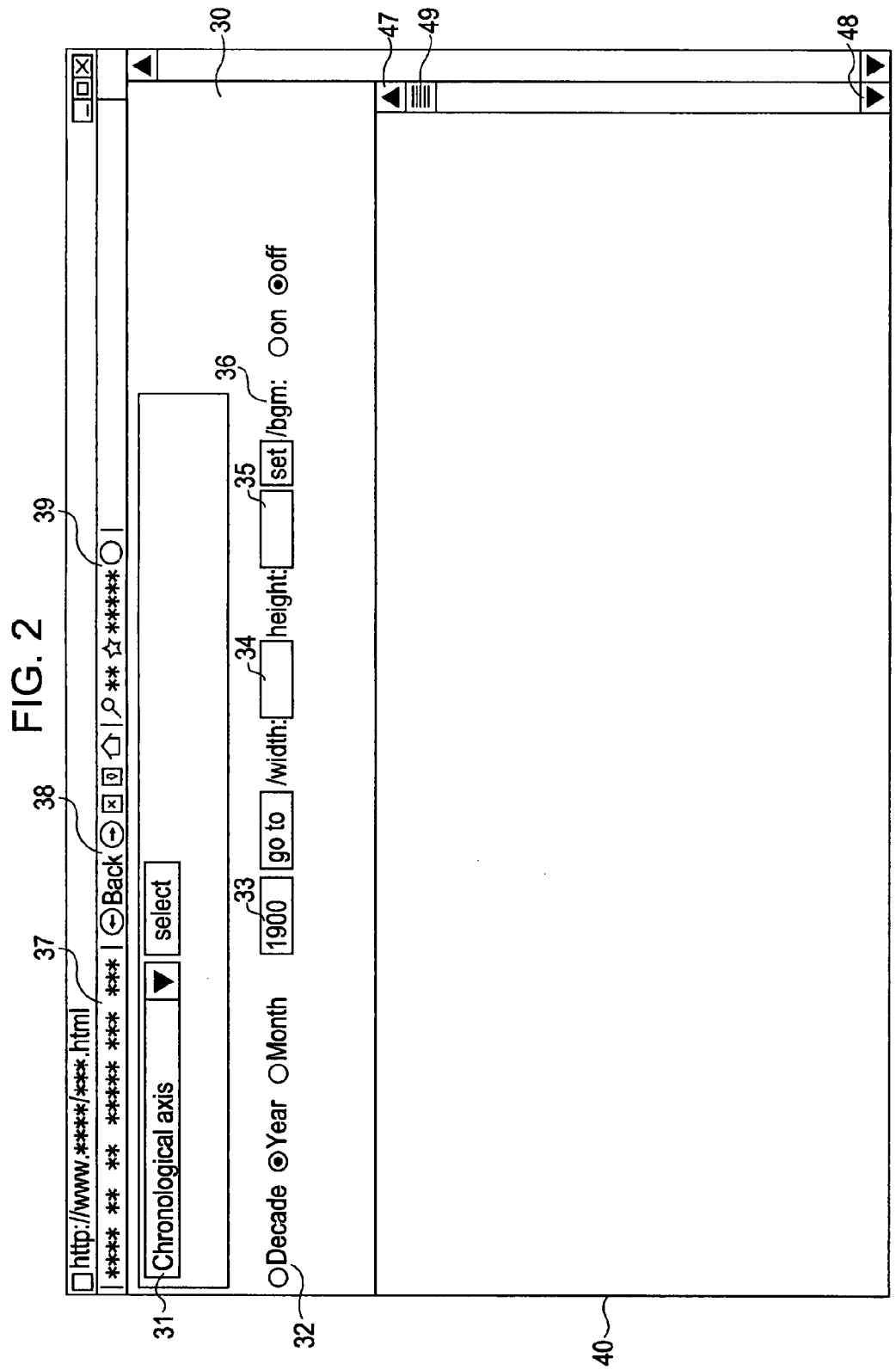
FIG. 2 is an illustration showing an example of a screen for generating a vertical-display horizontal-array multiple chronological table.

Thus, for example, a chronological-table generating screen 30 shown in FIG. 2 is displayed on the display 19 when a vertical-display horizontal-array multiple chronological table is to be generated.

Example of a Chronological-Table Generating Screen (FIG. 2)

More specifically, in the chronological-table generating screen 30 in the example shown in FIG. 2, in an upper region of the screen, a display-menu selecting area 31 is shown, a chronological-axis setting area 32, a period specifying area 33, a display-width specifying area 34, a height specifying area 35, and a background music (BGM) setting area 36 are shown below, and a chronological-table generating area 40 is provided further below.

The display-menu selecting area 31 provides a pull-down menu is used to select a chronological axis or to select a chronological table from various chronological tables described later. The chronological-axis setting area 32 is used to set one of "Decade", "Year", and "Month" as a chronological axis for display.

The period specifying area 33 is used to specify or display a period that is displayed as the chronological axis. The display-width specifying area 34 is used to specify a display width (in the horizontal direction of the screen) of each chronological table generated in the chronological-table generating area 40. The height specifying area 35 is used to specify a height of the chronological-table generating area 40. The BGM setting area 36 is used to set whether or not to attach BGM to a chronological table generated.

When a display width is not particularly specified in the display-width specifying area 34, for example, three chronological tables are arrayed horizontally with equal display widths in the chronological-table generating area 40 as will be described later.

On the right side of the chronological-table generating area 40, scroll buttons 47 and 48 and a scroll bar 49 are provided so that a chronological table generated in the chronological-table generating area 40 can be scrolled in the vertical direction of the screen.

On the upper side of the display-menu selecting area 31, buttons 37, 38, and 39 for various operations are displayed, and an address (URL) of the Web site or the like is displayed on the upper side of the buttons 37 to 39.

Case of "Year" Chronological Axis (FIGS. 3 to 7)

First, the user selects "Chronological axis" in the display-menu selecting area 31, and selects one of "Decade", "Year", and "Month" in the chronological-axis setting area 32.

Figure 3:
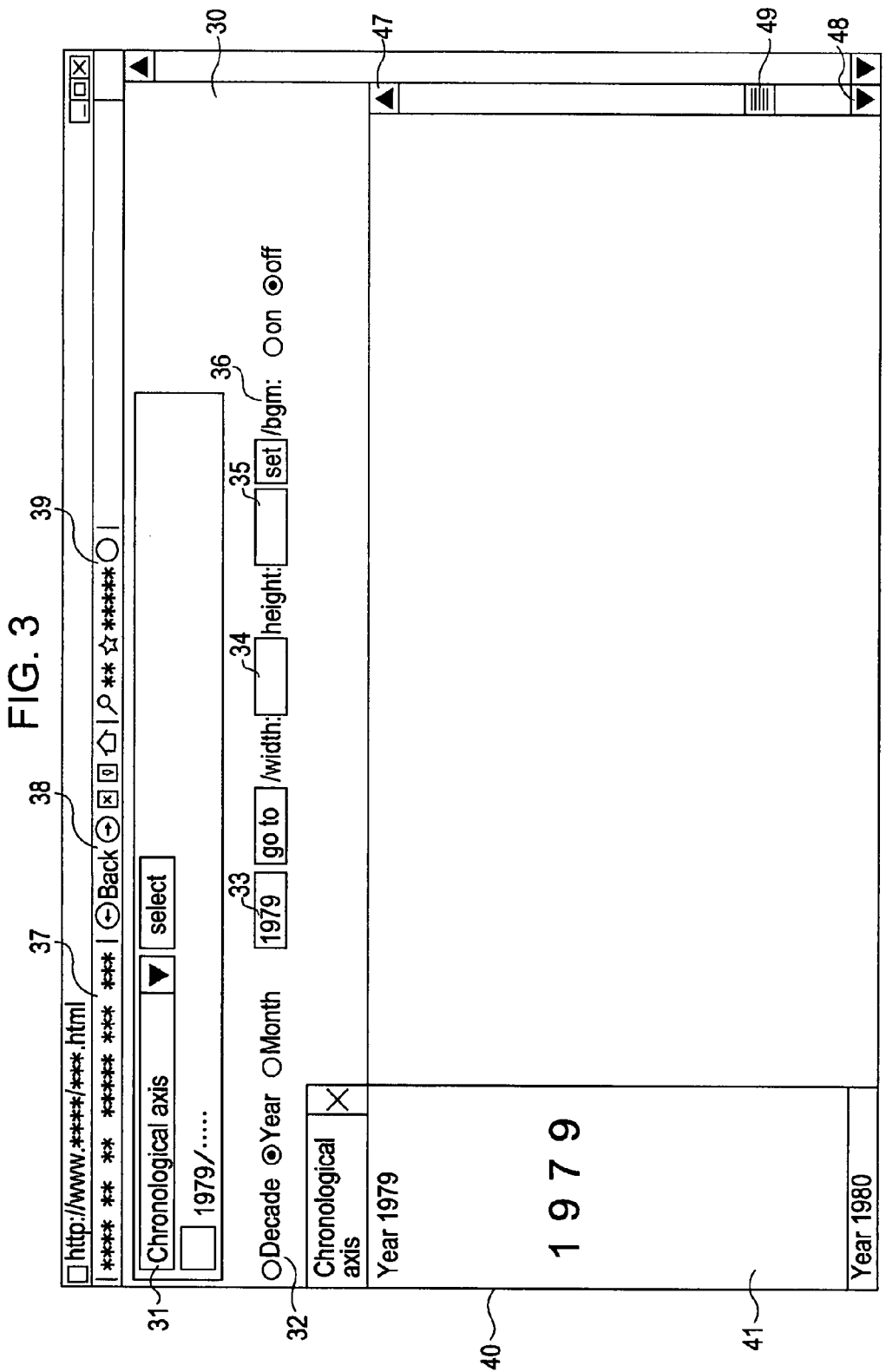
FIG. 3 is an illustration showing an example of a step in generation of a vertical-display horizontal-array multiple chronological table.

When "Year" is selected, as shown in FIG. 3, in a left part of the chronological-table generating area 40, a calendar year is displayed as a chronological axis 41. FIG. 3 shows a state where year 1979 is displayed as the chronological axis 41 as a result of scrolling the chronological-table generating area 40.

In this state, when the user selects a chronological table with a title of "History of S Company's products" in the display-menu selecting area 31 from various chronological tables provided at the Web site, the information processing apparatus 10 obtains data of the chronological table. Then, the CPU 11 lays out and displays a chronological table 1 corresponding to the data obtained in a left region 42 adjacent to the chronological axis in the chronological-table generating area 40, and the title "History of S Company's products" of the chronological table 1 and a button 42x for closing the chronological table 1 are displayed on the upper side of the region 42, as shown in FIG. 4.

Figure 4:
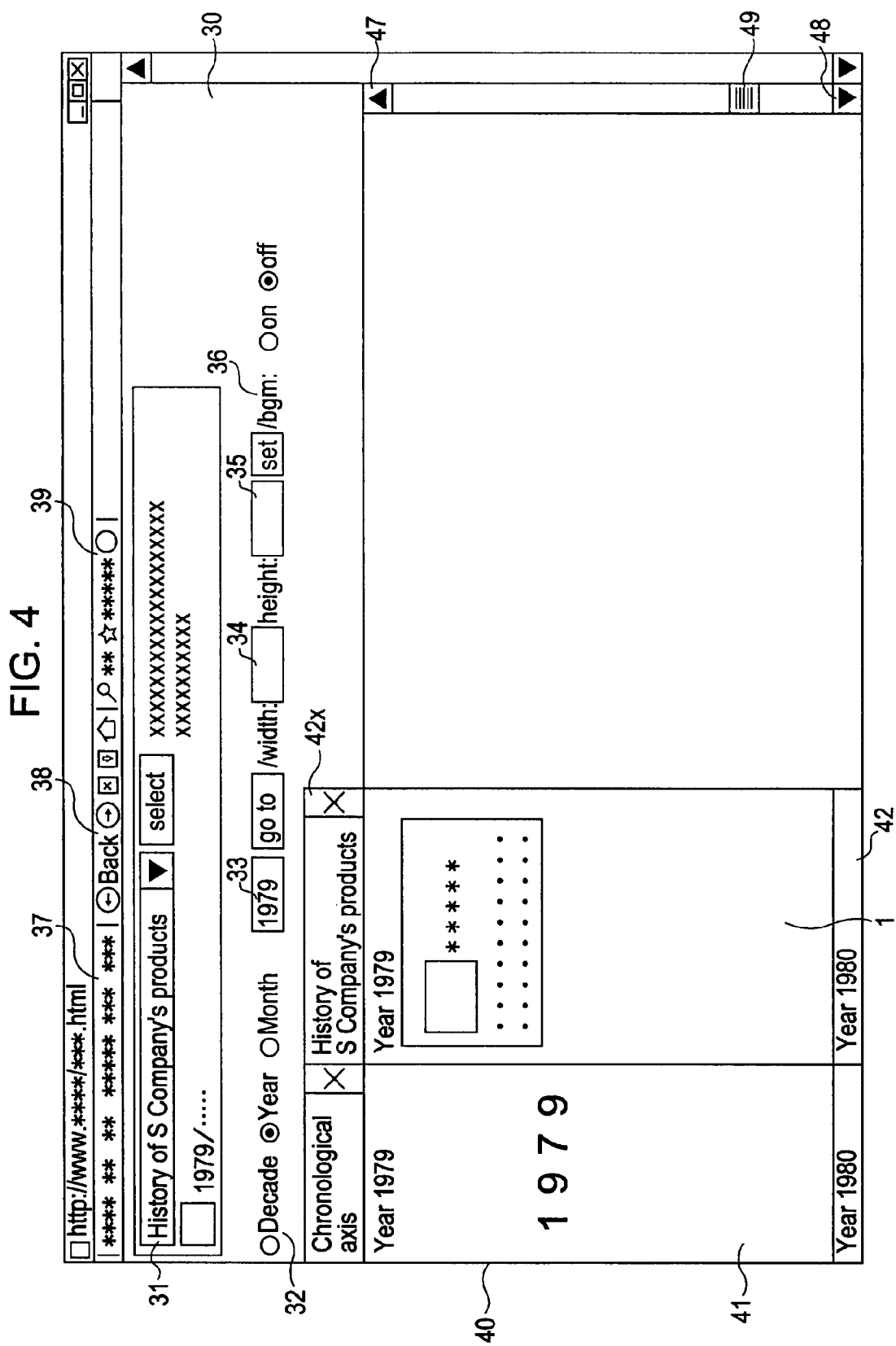
FIG. 4 is an illustration showing an example of a step in generation of a vertical-display horizontal-array multiple chronological table.

FIG. 4 shows a case where the display width of the chronological table 1 (the region 42) is not particularly specified, so that the chronological table 1 has a width that is one third of the width of the region of the chronological-table generating area 40 not including the region of the chronological axis 41, as described earlier.

The chronological table 1 shows a history of S Company's products, and FIG. 4 shows a picture and a description of a representative product that was released in 1979.

In this state, when the user selects a chronological table with a title of "Japanese TV animations" in the display-menu selecting area 31 from various chronological tables provided at the Web site, the information processing apparatus 10 obtains data of the chronological table. Then, the CPU 11 lays out and displays a chronological table 2 corresponding to the data obtained in a central region 43 adjacent to the region 42 in the chronological-table generating area 40, and displays the title "Japanese TV animations" of the chronological table 2 and a button 43x for closing the chronological table 2 in an upper region of the region 43, as shown in FIG. 5.

Figure 5:
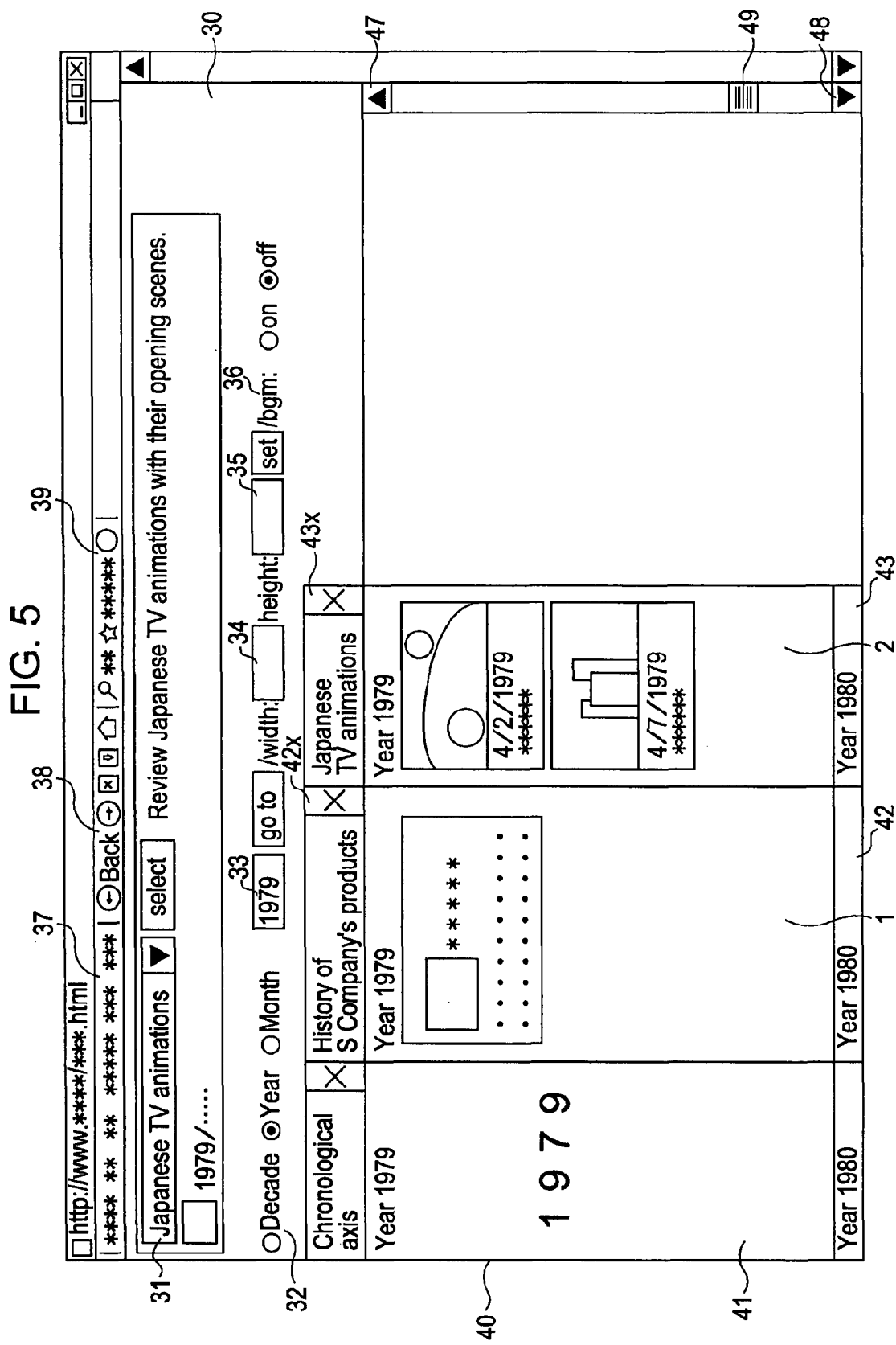
FIG. 5 is an illustration showing an example of a step in generation of a vertical-display horizontal-array multiple chronological table.

The chronological table 2 shows a history of Japanese TV animations, and FIG. 5 shows images representing two representative animations broadcast in 1979.

Furthermore, in this state, when the user selects a chronological table with a title of "Chronology of comic C1" in the display-menu selecting area 31 from various chronological tables provided at the Web site, the information processing apparatus 10 obtains data of the chronological table. Then, the CPU 11 lays out and displays a chronological table 3 corresponding to the data obtained in a right region 44 adjacent to the region 43 in the chronological-table generating area 40, and displays the title "Chronology of comic C1" of the chronological table 3 and a button 44x for closing the chronological table 3 in an upper region of the region 44, as shown in FIG. 6.

Figure 6:
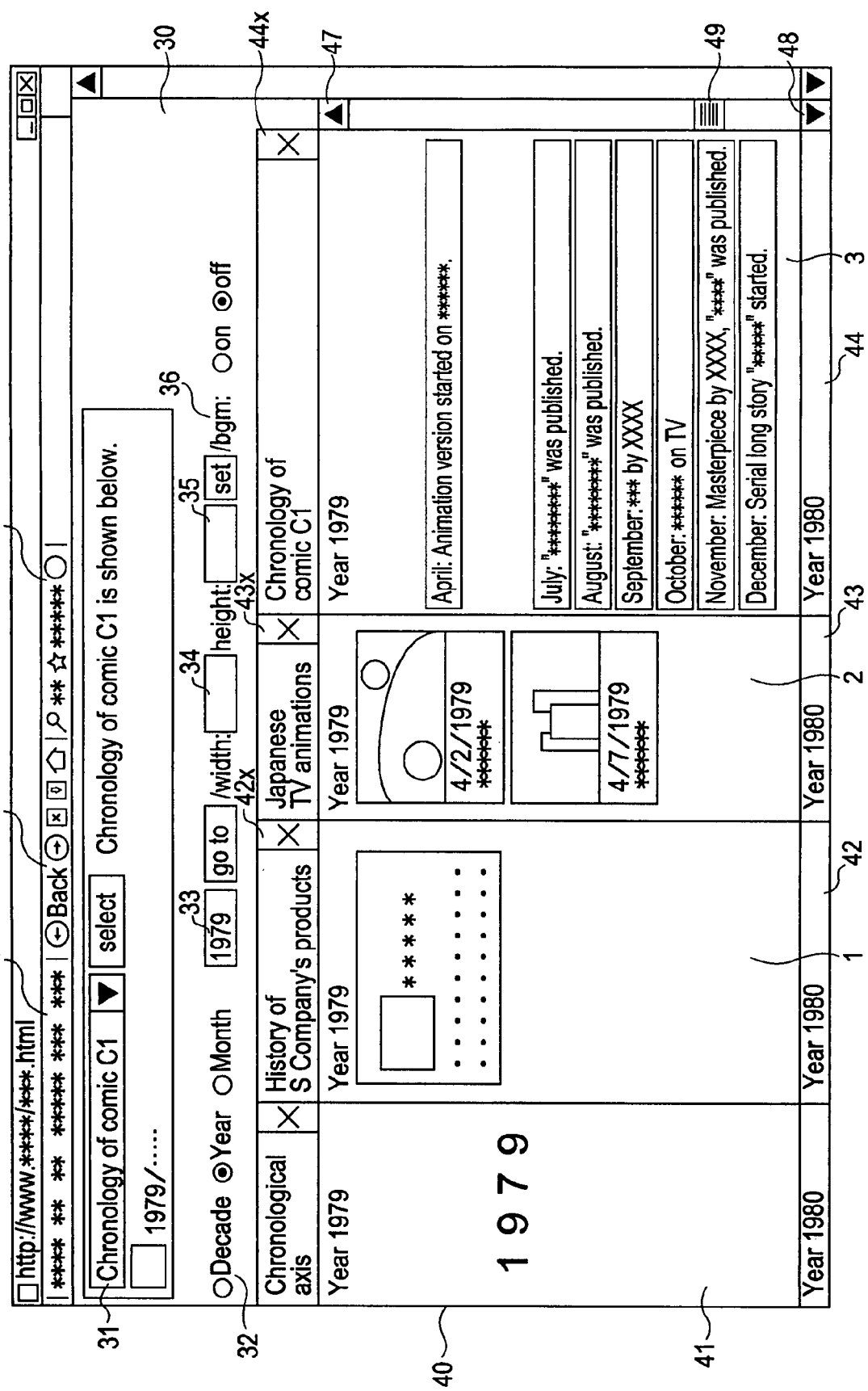
FIG. 6 is an illustration showing an example of a vertical-display horizontal-array multiple chronological table that has been generated.

The chronological table 3 shows a history of publications, animations, and so forth from the birth to the present of a comic with a title "C1", and FIG. 6 shows seven events that occurred in 1979.

As described above, the three chronological tables 1, 2, and 3 are generated and arrayed horizontally in the chronological-table generating area 40 on the chronological-table generating screen 30.

In the state shown in FIG. 6, only the portion of the year 1979 is shown. However, all the data of each of the chronological tables obtained is loaded and stored in the main memory 14 and a display memory in the display processor 18, and portions of the year 1978 and earlier and portions of the year 1980 and later can be displayed in the chronological-table generating area 40 by scrolling using the scroll buttons 47 and 48 or the scroll bar 49.

Figure 7:
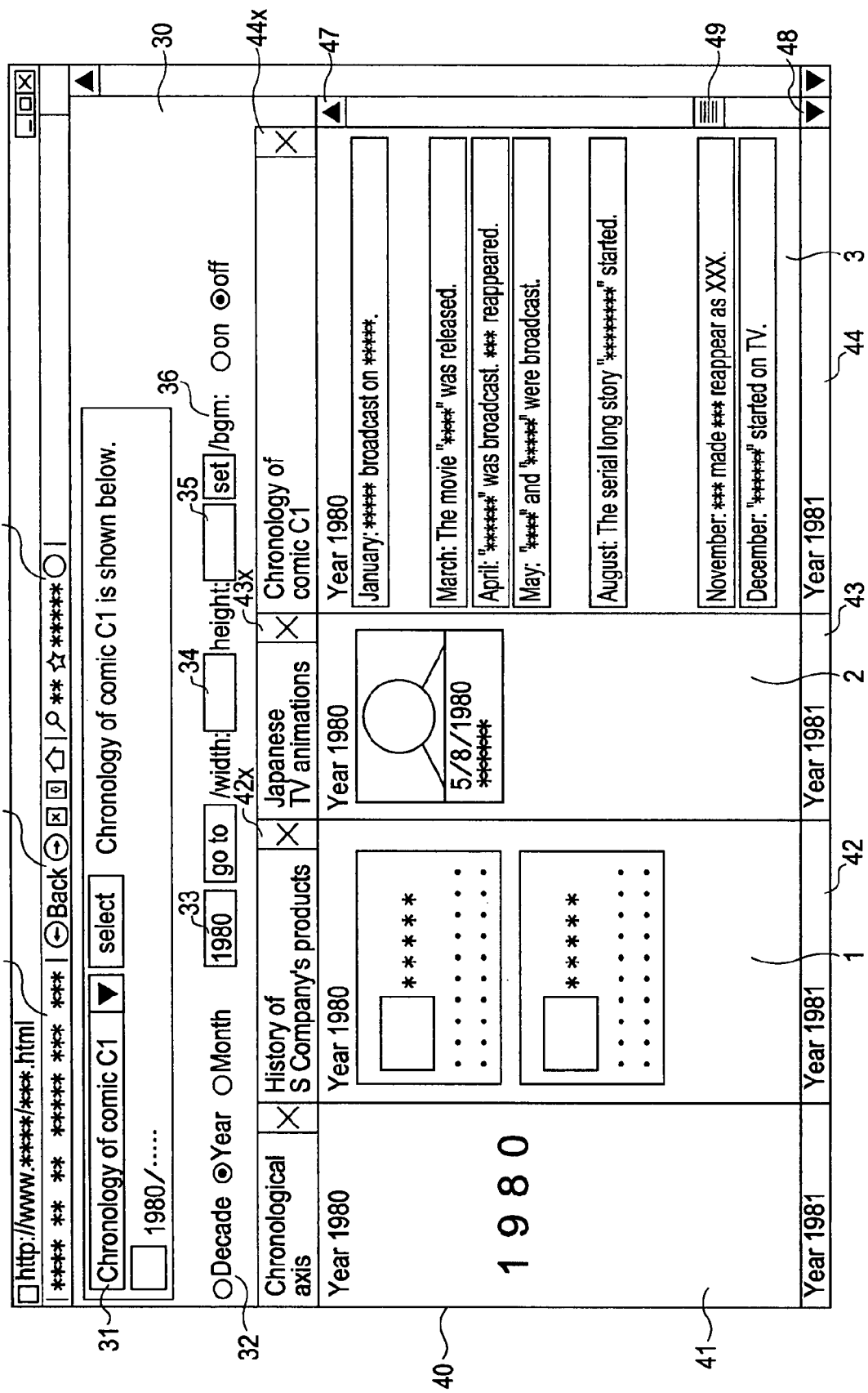
FIG. 7 is an illustration showing an example of a vertical-display horizontal-array multiple chronological table that has been generated.

FIG. 7 shows a state where a portion of the year 1980 is displayed. The chronological table 1 shows two events, the chronological table 2 shows one event, and the chronological table 3 shows seven events.

Figure 8:
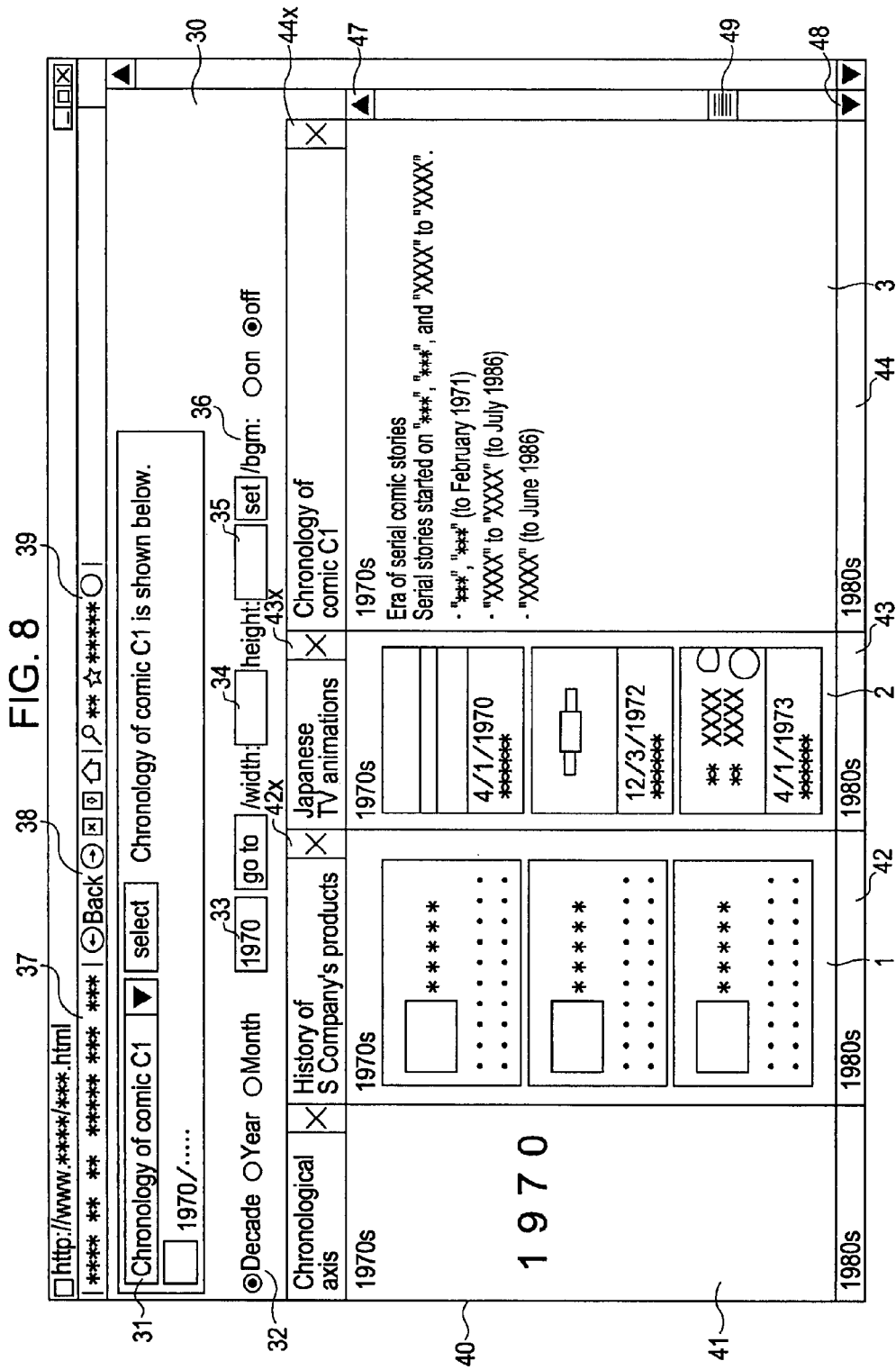
FIG. 8 is an illustration showing an example of a vertical-display horizontal-array multiple chronological table that has been generated.
Figure 9:
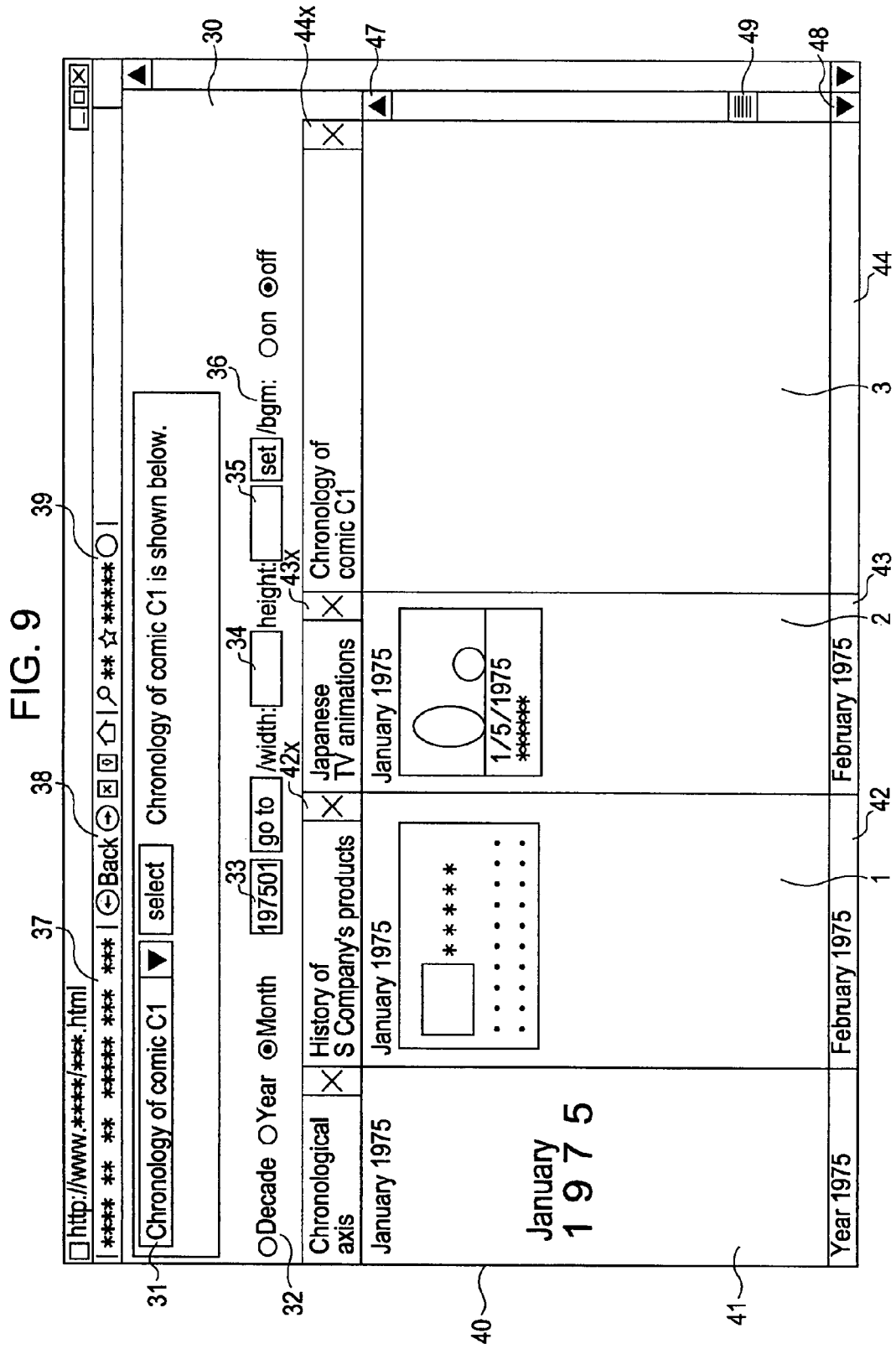
FIG. 9 is an illustration showing an example of a vertical-display horizontal-array multiple chronological table that has been generated.

Zoom Out and Zoom In (FIGS. 8 and 9)

When the user specifies "Decade" in the chronological-axis setting area 32 when selecting "Chronological axis" in the display-menu selecting area 31, and sequentially selects the chronological table with the title of "History of S Company's products", the chronological table with the title of "Japanese TV animations", and the chronological table with the title of "Chronology of comic C1" in the display-menu selecting area 31 similarly to the example described above, as a zoom-out screen, in the chronological-table generating area 40, a decade is displayed as the chronological axis 41, the chronological table 1 is laid out and displayed in the region 42, the chronological table 2 is laid out and displayed in the region 43, and the chronological table 3 is laid out and displayed in the region 44, whereby a horizontal-array multiple chronological table is generated, as shown in FIG. 8.

FIG. 8 shows a case where, as a result of scrolling the chronological-table generating area 40, the decade 1970s is displayed as the chronological axis 41, pictures and descriptions regarding three representative products released in the 1970s among products of S Company are displayed as the chronological table 1, images representing three representative animations broadcast in the 1970s among Japanese TV animations are displayed as the chronological table 2, and several events that occurred in the 1970s regarding the comic "C1" are displayed as the chronological table 3.

When the user specifies "Month" in the chronological-axis setting area 32 when selecting "Chronological axis" in the display-menu selecting area 31, and sequentially selects the chronological table with the title of "History of S Company's products", the chronological table with the title of "Japanese TV animations", and the chronological table with the title of "Chronology of comic C1" in the display-menu selecting area 31 similarly to the example described above, as a zoom-in screen, in the chronological-table generating area 40, a month is displayed as the chronological axis 41, the chronological table 1 is laid out and displayed in the region 42, the chronological table 2 is laid out and displayed in the region 43, and the chronological table 3 is laid out and displayed in the region 44, whereby a horizontal-array multiple chronological table is generated, as shown in FIG. 9.

FIG. 9 shows a case where, as a result of scrolling the chronological-table generating area 40, the month January 1975 is displayed as the chronological axis 41, a picture and a description regarding a representative product released in January 1975 among products of S Company are displayed as the chronological table 1, an image representing a representative animation broadcast in January 1975 among Japanese TV animations is displayed as the chronological table 2, and no event that occurred in January 1975 regarding the comic "C1" is displayed as the chronological table 3.

Figure 10:
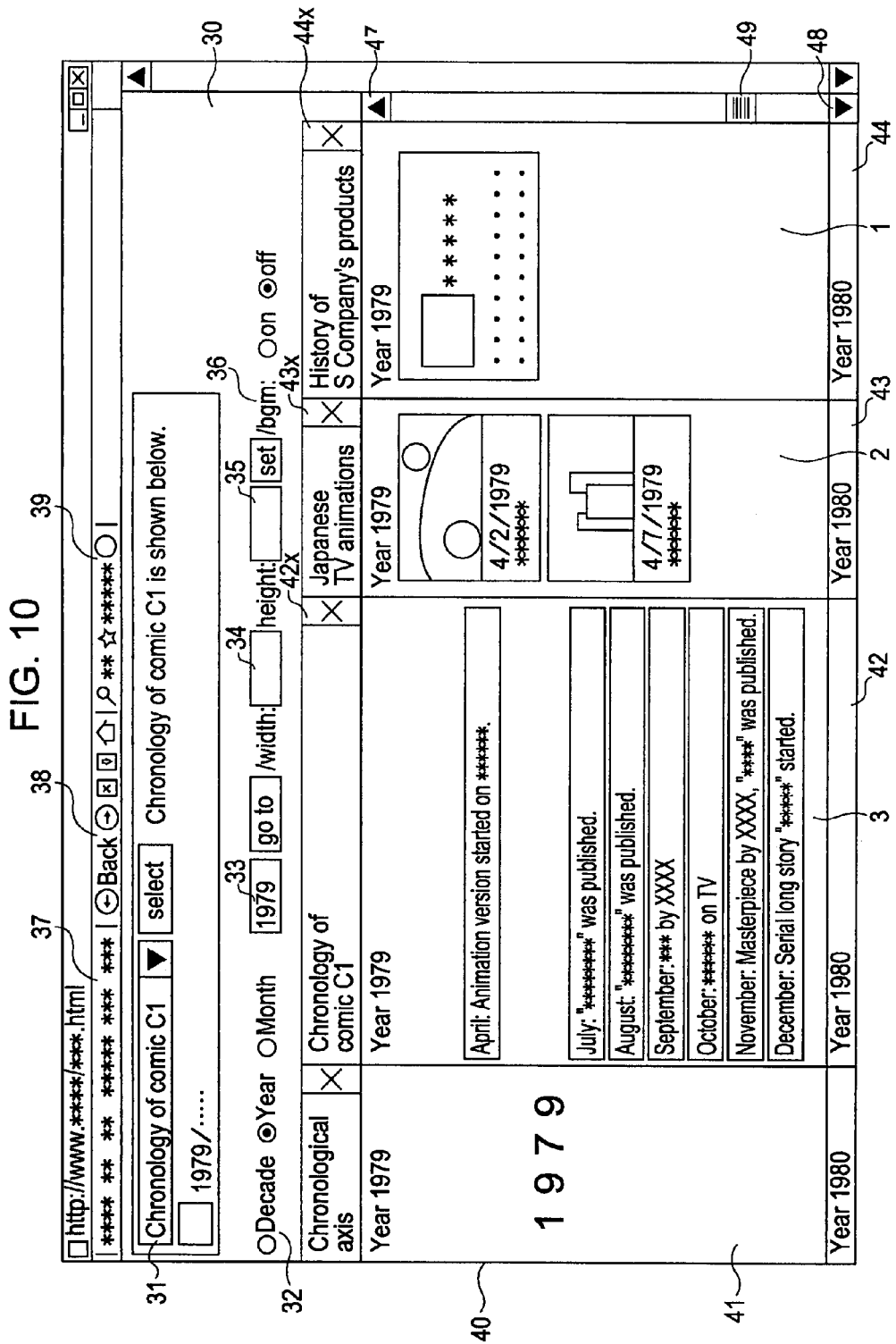
FIG. 10 is an illustration showing an example of rearrangement of a vertical-display horizontal-array multiple chronological table that has been generated.

2-2. Editing of a Vertical-Display Horizontal-Array Multiple Chronological Table (FIG. 10)

The vertical-display horizontal-array multiple chronological tables described above can be edited as follows.

Rearrangement of a Multiple Chronological Table

First, a plurality of chronological tables laid out in the chronological-table generating area 40 can be rearranged.

For example, as shown in FIG. 6, in the multiple chronological table in which the chronological table 1 ("History of S Company's products) is laid out and displayed in the left region 42 of the chronological-table generating area 40, the chronological table 2 ("Japanese TV animations") is laid out and displayed in the central region 43, and the chronological table 3 ("Chronology of comic C1") is laid out and displayed in the right region 44, it is possible to exchange the chronological tables 1 and 3 on the left and right sides to generate a multiple chronological table in which the chronological table 3 ("Chronology of comic C1") is laid out and displayed in the left region 42 of the chronological-table generating area 40, the chronological table 2 ("Japanese TV animations") is laid out and displayed in the central region 43, and the chronological table 1 ("History of S Company's products) is laid out and displayed in the right region 44.

More specifically, with the multiple chronological table generated as shown in FIG. 6, the rearrangement is executed by the CPU 11 in response to the user operating predetermined buttons among the buttons 37 to 39 to open a "Rearrangement mode" from the pull-down menu and selecting a mode "Exchange left and right among three chronological tables".

When three chronological tables can be generated in the chronological-table generating area 40, in the "Rearrangement mode", other modes such as "Exchange left and center among three chronological tables" and "Exchange center and right among three chronological tables" are provided. The CPU 11 rearranges the plurality of chronological tables according to a mode selected by the user.

Replacement of Chronological Tables

In place of some or all the chronological tables laid out in the chronological-table generating area 40, it is possible to lay out chronological tables that are obtained separately.

For example, in the state shown in FIG. 6, it is possible to close the chronological table 1 ("History of S Company's products") by operating the button 42x and to select another chronological table in the display-menu selecting area 31 and lay out and display the chronological table in the region 42.

Setting or Changing of the Number of Chronological Tables that can be Laid Out

In the example described above, three chronological tables can be laid out in the chronological-table generating area 40. However, the user may be allowed to set the number of chronological tables that can be laid out in the chronological-table generating area 40 as desired within a predetermined range by an operation on the chronological-table generating screen 30.

Furthermore, after setting the number of chronological tables that can be laid out and generating a multiple chronological table, the user may be allowed to increase or decrease the number of chronological tables that can be laid out within the predetermined range and to add new chronological tables in or delete some chronological tables from the multiple chronological table.

Setting or Changing of the Display Width of Each Chronological Table

For example, in the example shown in FIGS. 4 to 6, each time a chronological table is selected in the display-menu selecting area 31, the user may be allowed to specify the display width of each of the regions 42, 43, and 44, i.e., the chronological tables 1, 2, and 3, as desired within a predetermined range by specifying a display width in the display-width specifying area 34.

Furthermore, after specifying the display width of each chronological table and generating a multiple chronological table, the user may be allowed to change the display width of each chronological table within the predetermined range.

Conversion of the Array Mode

As editing of a multiple chronological table, according to an operation on the chronological-table generating screen 30, the CPU 11 can convert the vertical-display horizontal-array multiple chronological table generated as shown in FIGS. 6 to 10 into a horizontal-display vertical-array multiple chronological table, i.e., a chronological axis is represented in the horizontal direction of the screen, chronological events are arrayed in the horizontal direction of the screen, and a plurality of chronological tables are arrayed in the vertical direction of the screen in the chronological-table generating area 40.

Others

As generation or editing of a multiple chronological table, for example, in the state where the chronological tables 1 and 2 are laid out and displayed in the regions 42 and 43 of the chronological-table generating area 40 and no chronological table is laid out and displayed in the region 44 as shown in FIG. 5, or in the state where a multiple chronological table including the chronological tables 1, 2, and 3 is generated and then the chronological table 3 is closed as shown in FIG. 6, by accessing another Web site according to an operation by the user, it is possible to present various chronological tables provided at the Web site in a screen that is displayed partially overlapping the chronological-table generating screen 30. In this case, when one of the chronological tables is selected by the user, the selected chronological table is laid out and displayed in the region 44, whereby a multiple chronological table including three chronological tables is generated.

2-3. Chronological-Table Generating Process (FIG. 11)

Figure 11:
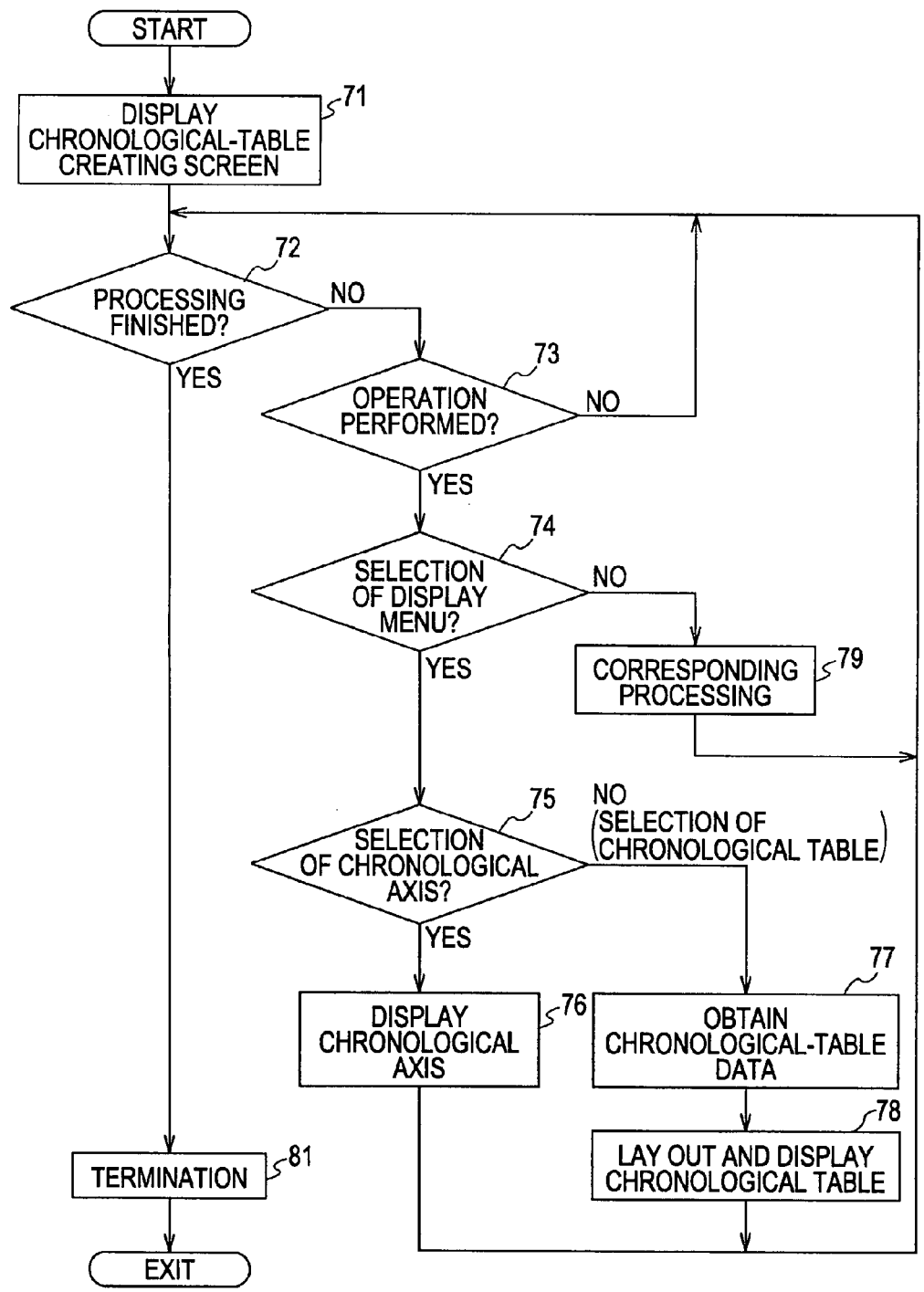
FIG. 11 is a flowchart showing an example of a process of generating a vertical-display horizontal-array multiple chronological table.

FIG. 11 shows an example of a chronological-table generating process executed by the CPU 11 of the information processing apparatus 10 when a multiple chronological table is generated as described above.

In this example, the chronological-table generating process is stared when a Web site that provides various chronological tables is accessed. First, in step 71, the chronological-table generating screen 30 shown in FIG. 2 is displayed on the display 19.

Then, in step 72, it is checked whether to exit the chronological-table generating process. When the chronological-table generating process is to be exited, the process proceeds to step 81 to execute processing for termination, and then the chronological-table generating process is exited, as will be described later. When the chronological-table generating process is not to be exited, the process proceeds to step 73, in which it is checked whether an operation other than an exiting operation has been performed.

When no operation has been performed, the process returns from step 73 to step 72. On the other hand, when an operation has been performed, the process proceeds from step 73 to step 74, in which it is checked whether the operation relates to selection of a display menu in the display-menu selecting area 31.

When the operation performed relates to selection of a display menu, the process proceeds from step 74 to step 75, in which it is checked whether the operation is selection of a chronological axis. When the operation is selection of a chronological axis, the process further proceeds to step 76, in which the chronological axis 41 is displayed in a left-end region of the chronological-table generating area 40 according to an instruction in the chronological-axis setting area 32. The process then returns to step 72.

When the operation relates to selection of a display menu but is not selection of a chronological axis, i.e., when the operation is selection of a chronological table, the process proceeds from step 75 to step 77, in which data of the selected chronological table is obtained. Furthermore, the process proceeds to step 78, in which the chronological table is laid out and displayed in a region closest to the chronological axis 41 among regions where no chronological table is laid out and displayed in the regions of the chronological-table generating area 40 divided as described earlier. The process then returns to step 72.

When it is determined in step 74 that the operation does not relate to selection of a display menu but relates to editing such as the types of editing described earlier, the process proceeds to step 79, in which corresponding processing for editing is executed. The process then returns to step 72.

In the system of the example shown in FIG. 1, the multiple chronological table generated as described above can be stored in the internal storage device 13 or the local storage 25.

In this case, when the user exits generation of a chronological table, for example, by closing the chronological-table generating screen 30, in step 81, as processing for termination, the CPU 11 asks the user whether to save the chronological table that has been generated. When the user instructs saving and a saving location, the CPU 11 records the chronological table in the specified saving location. At the time of the termination, it is possible to record the chronological tables that are displayed, the unit of chronological axis set in the chronological-axis setting area 32 ("Decade", "Year", or "Month"), the period displayed as the chronological axis 41, the layout positions of the individual chronological tables, and so forth. This allows continuing the task of generating or editing when the multiple-chronological-table generating process is resumed next time by a resume function.

The multiple chronological table recorded in the internal storage device 13 or the local storage 25 can be retrieved from the internal storage device 13 or the local storage 25 and displayed on the display 19 as needed. At that time, in the chronological-table screen displayed on the display 19, similarly to the chronological-table generating screen 30, a plurality of chronological tables are laid out in a chronological-table generating area (a chronological-table display area), and editing operations are allowed so that editing such as the types of editing described earlier can be performed.

2-4. Generation and Editing of a Horizontal-Display Vertical-Array Multiple Chronological Table (FIGS. 12 to 24)

Also in a case of generating a horizontal-display vertical-array multiple chronological table, the user activates a Web browser and accesses the Web site described earlier by an operation of the operation input unit 15.

Figure 12:
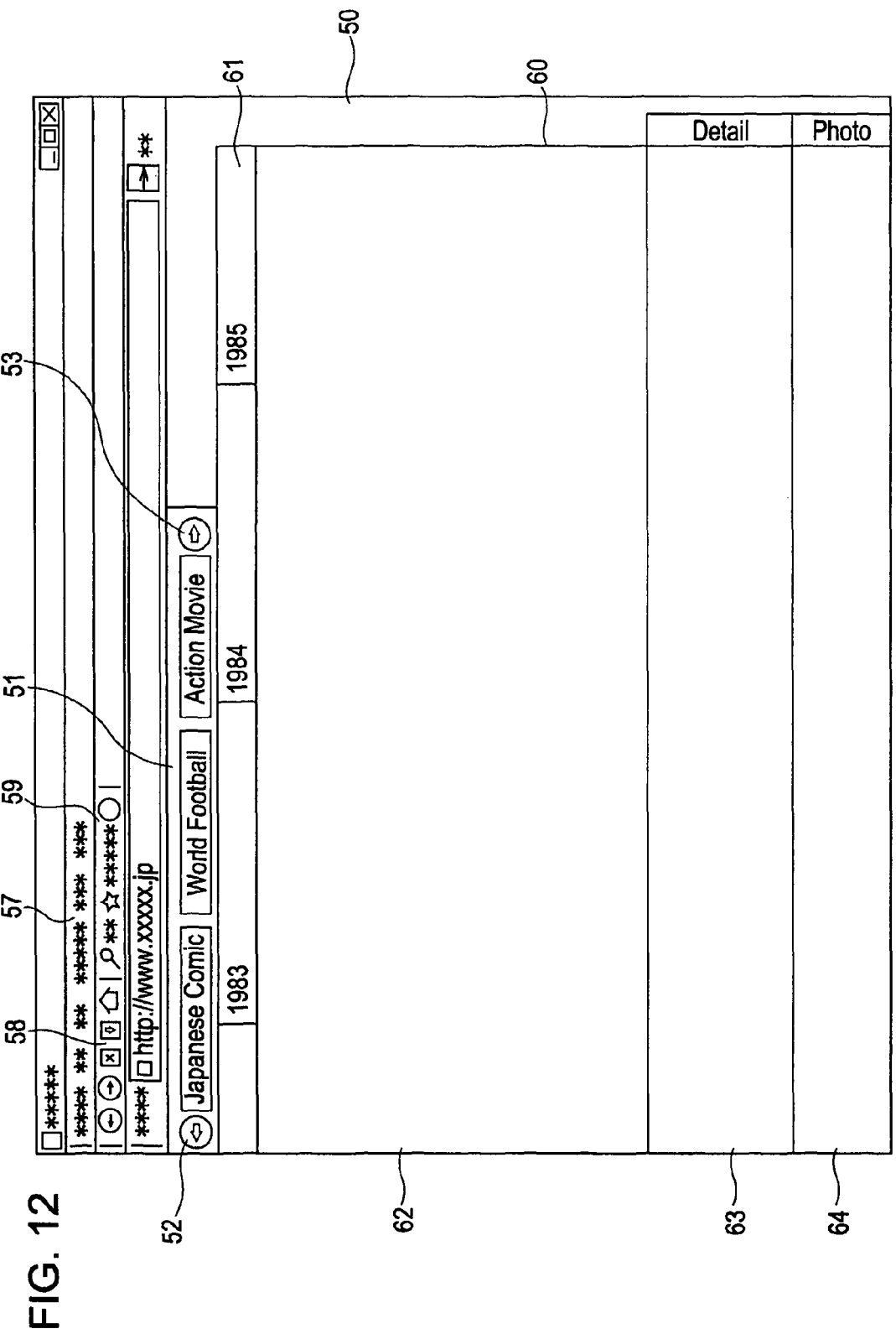
FIG. 12 is an illustration showing an example of a screen for generating a horizontal-display vertical-array multiple chronological table.

Then, for example, a chronological-table generating screen 50 shown in FIG. 12 is displayed on the display 19.

More specifically, in the chronological-table generating screen 50 of the example shown in FIG. 12, buttons 51 representing various chronological tables provided at the Web site are displayed in an upper region of the screen, and a chronological-table generating area 60 is provide below the buttons 51.

In the chronological-table generating area 60, a chronological axis 61 representing calendar years, such as 1983, 1984, and 1985, is displayed in an upper-end region. Furthermore, the region below the chronological axis 61 is divided in the vertical direction of the screen into a region 62 where two chronological tables can be laid out and displayed, a region 63 where details of a certain even are laid out and displayed, and a region 64 where a picture image is laid out and displayed, as will be described later.

On the left and right sides of the buttons 51, buttons 52 and 53 for scrolling the chronological table generated in the chronological-table generating area 60 in the horizontal direction of the screen are provided. Furthermore, an address (URL) of the Web site is displayed above the buttons 51, and buttons 57, 58, and 59 for various operations are displayed above the address.

The user sequentially selects desired chronological tables by sequentially operating buttons representing the desired chronological tables among the buttons 51.

When the user first selects a chronological table with a title of "Japanese Comic", the information processing apparatus 10 obtains data of the chronological table. Then, the CPU 11 lays out and displays a chronological table 5 corresponding to the data obtained in an upper region of the region 62, and displays the title "Japanese Comic" of the chronological table 5 outside the chronological-table generating area 60 on the right side of the chronological table 5, as shown in FIG. 13.

Figure 13:
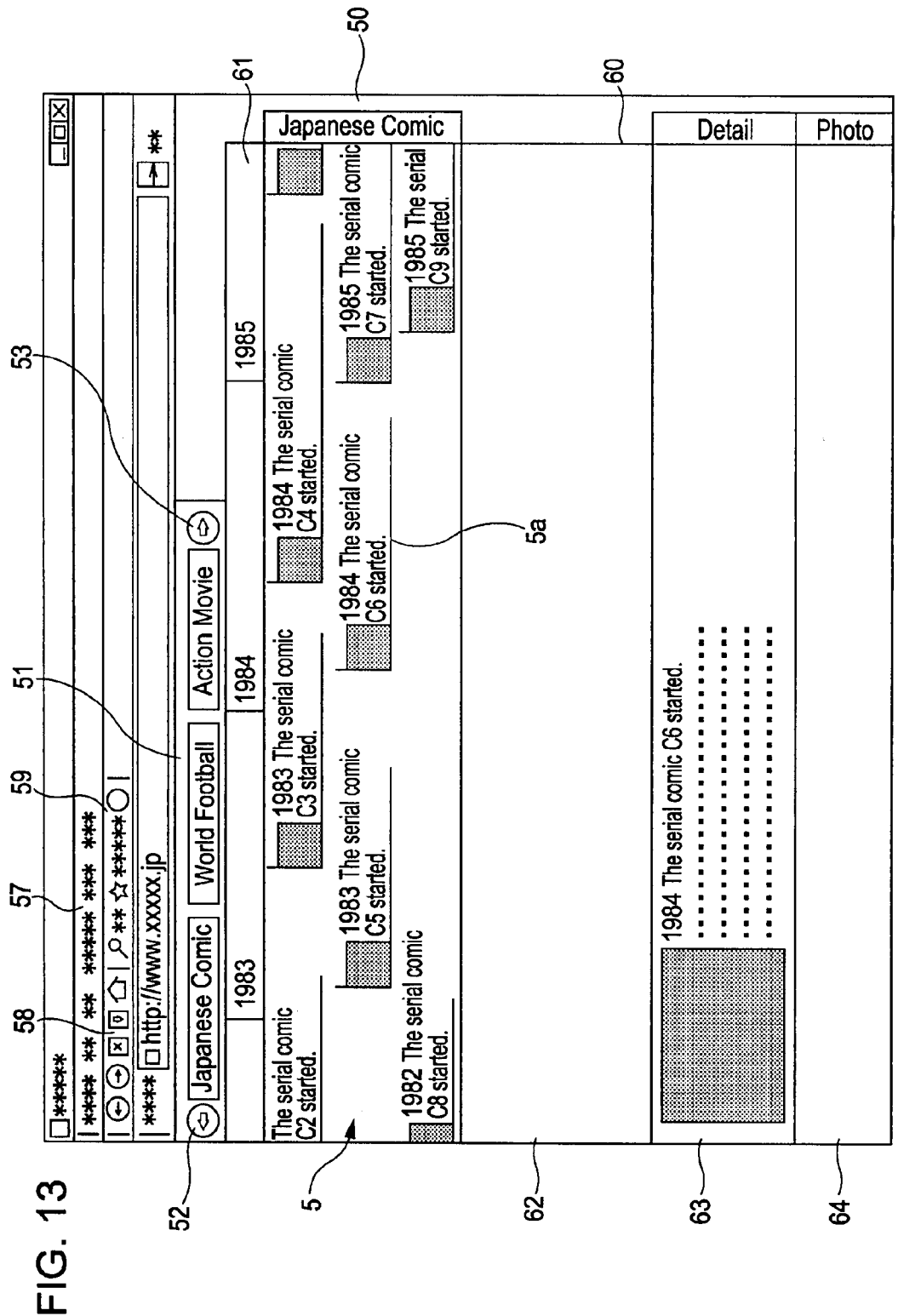
FIG. 13 is an illustration showing an example of a step in generation of a horizontal-display vertical-array multiple chronological table.

The chronological table 5 shows a history of Japanese comics, and FIG. 13 shows a portion of the year 1982 to the year 1985.

At this time, when an event 5a in the chronological table is specified, details (image or description) regarding the specified event 5a are displayed in the region 63.

Figure 14:
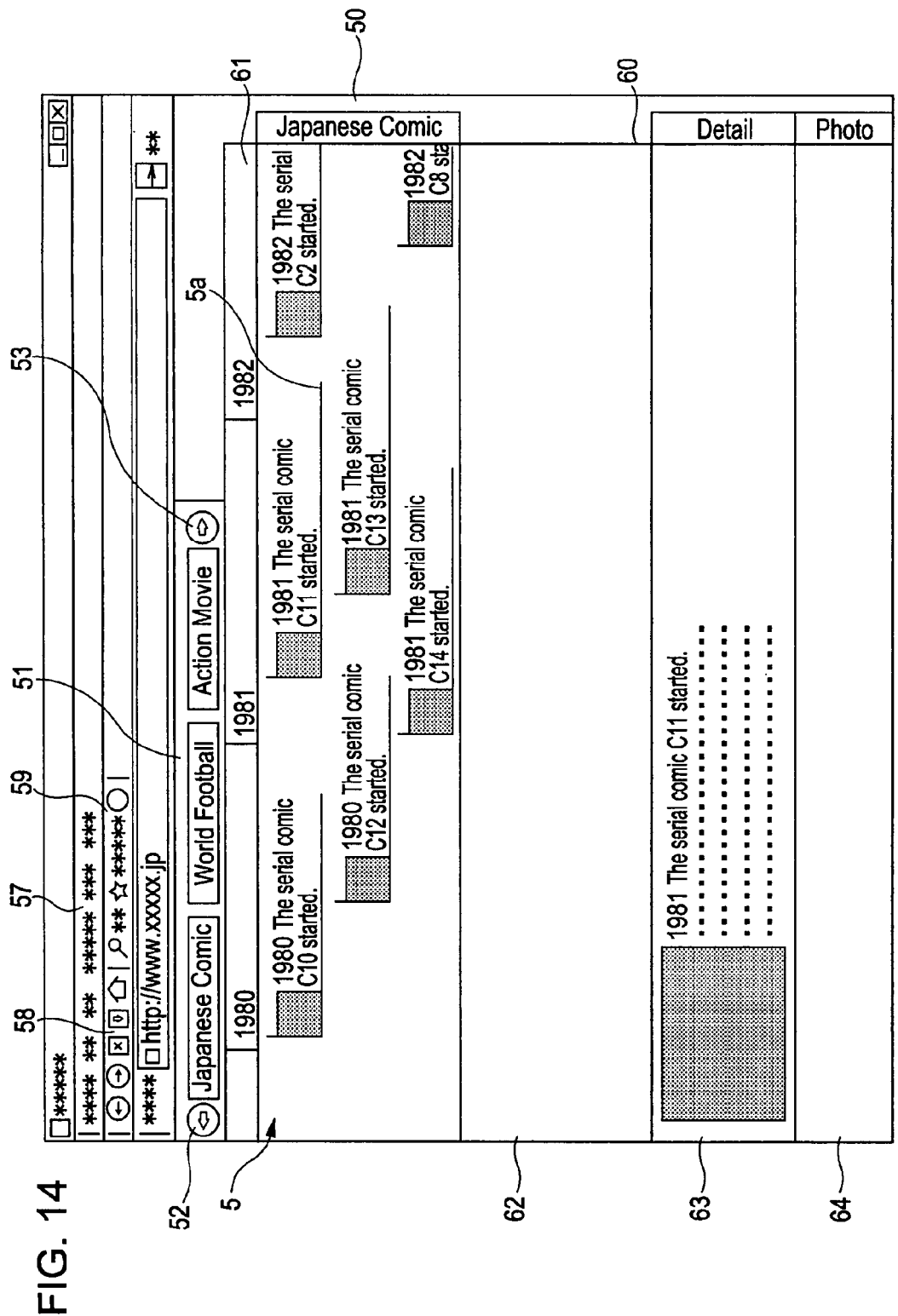
FIG. 14 is an illustration showing an example of a step in generation of a horizontal-display vertical-array multiple chronological table.
Figure 15:
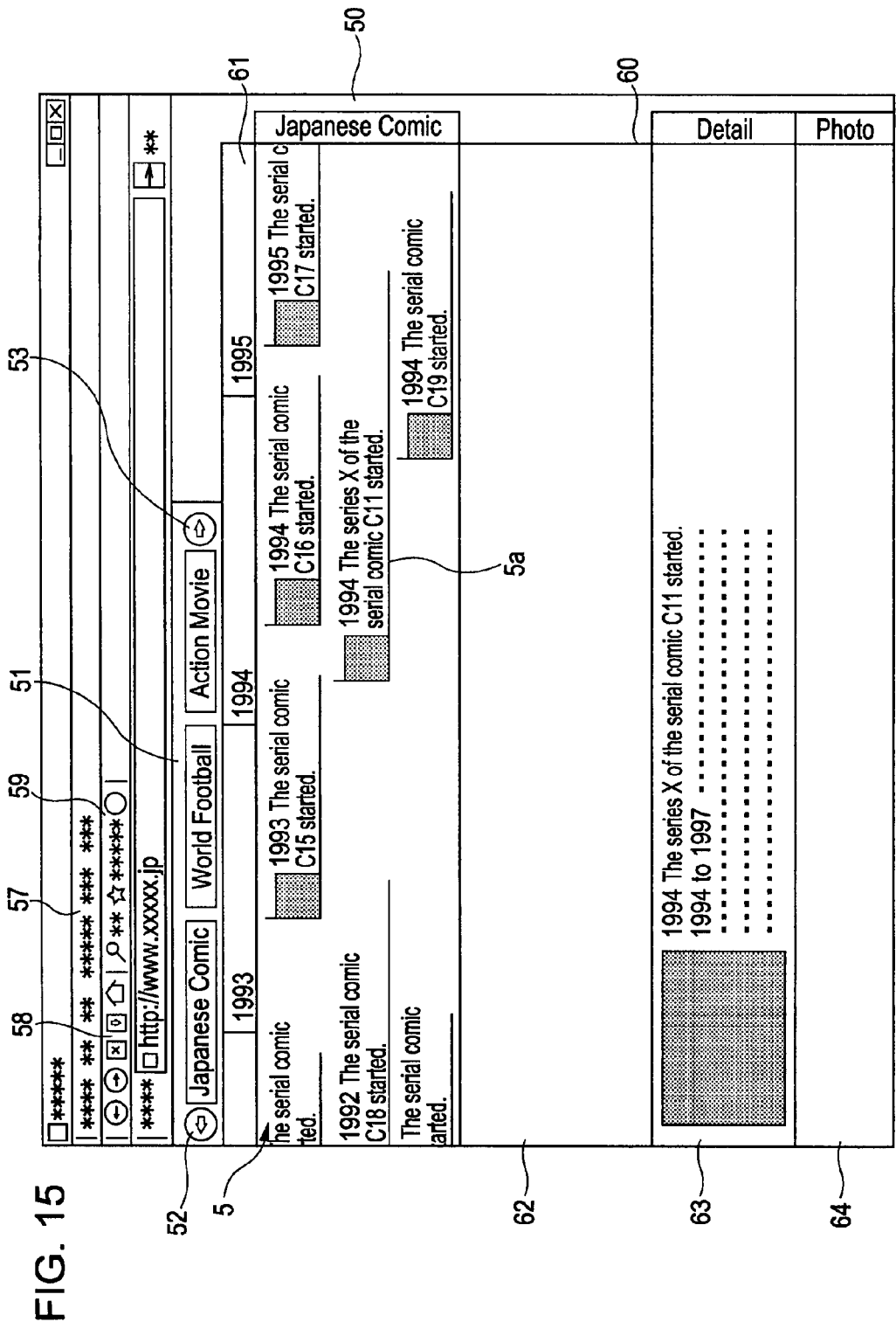
FIG. 15 is an illustration showing an example of a step in generation of a horizontal-display vertical-array multiple chronological table.

When the button 52 is operated in this state, for example, a portion of the year 1979 to the year 1982 is displayed as the chronological table 5, as shown in FIG. 14. On the other hand, when the button 53 is operated, for example, a portion of the year 1992 to the year 1995 is displayed as the chronological table 5, as shown in FIG. 15. When the button 53 is operated further, for example, a portion of the year 2000 to the year 2002 is displayed as the chronological table 5, as shown in FIG. 16.

Figure 16:
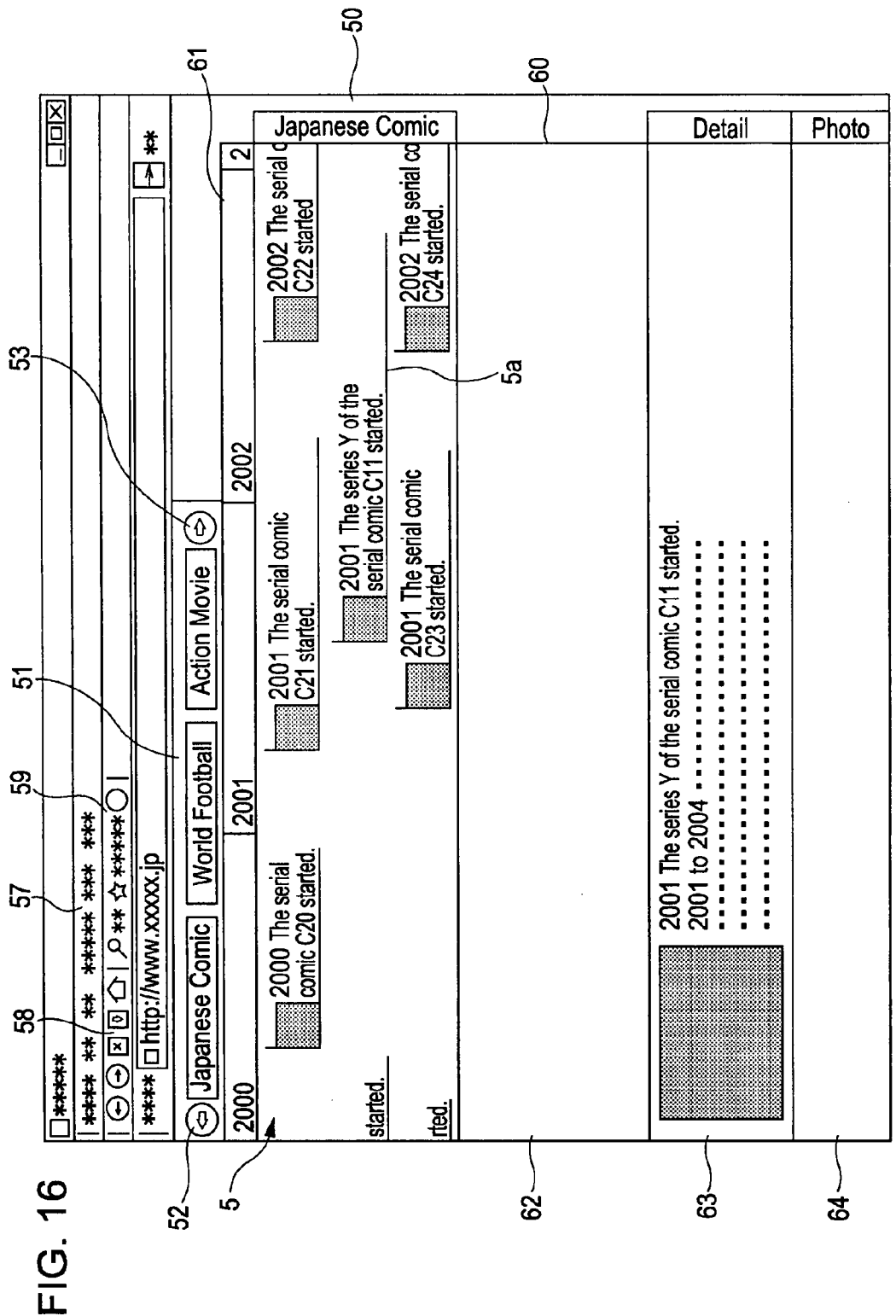
FIG. 16 is an illustration showing an example of a step in generation of a horizontal-display vertical-array multiple chronological table.

Also in the states shown in FIGS. 14, 15, and 16, the details regarding the event 5a specified in the chronological table 5 are displayed in the region 63.

Furthermore, for example, when a chronological table with a title of "World Football" is selected in the state shown in FIG. 16, the information processing apparatus 10 obtains data of the chronological table. Then, the CPU 11 lays out and displays a chronological table 6 corresponding to the data obtained in a lower region of the region 62, and displays the title "World Football" of the chronological table 6 outside the chronological-table generating area 60 on the right side of the chronological table 6, as shown in FIG. 17.

Figure 17:
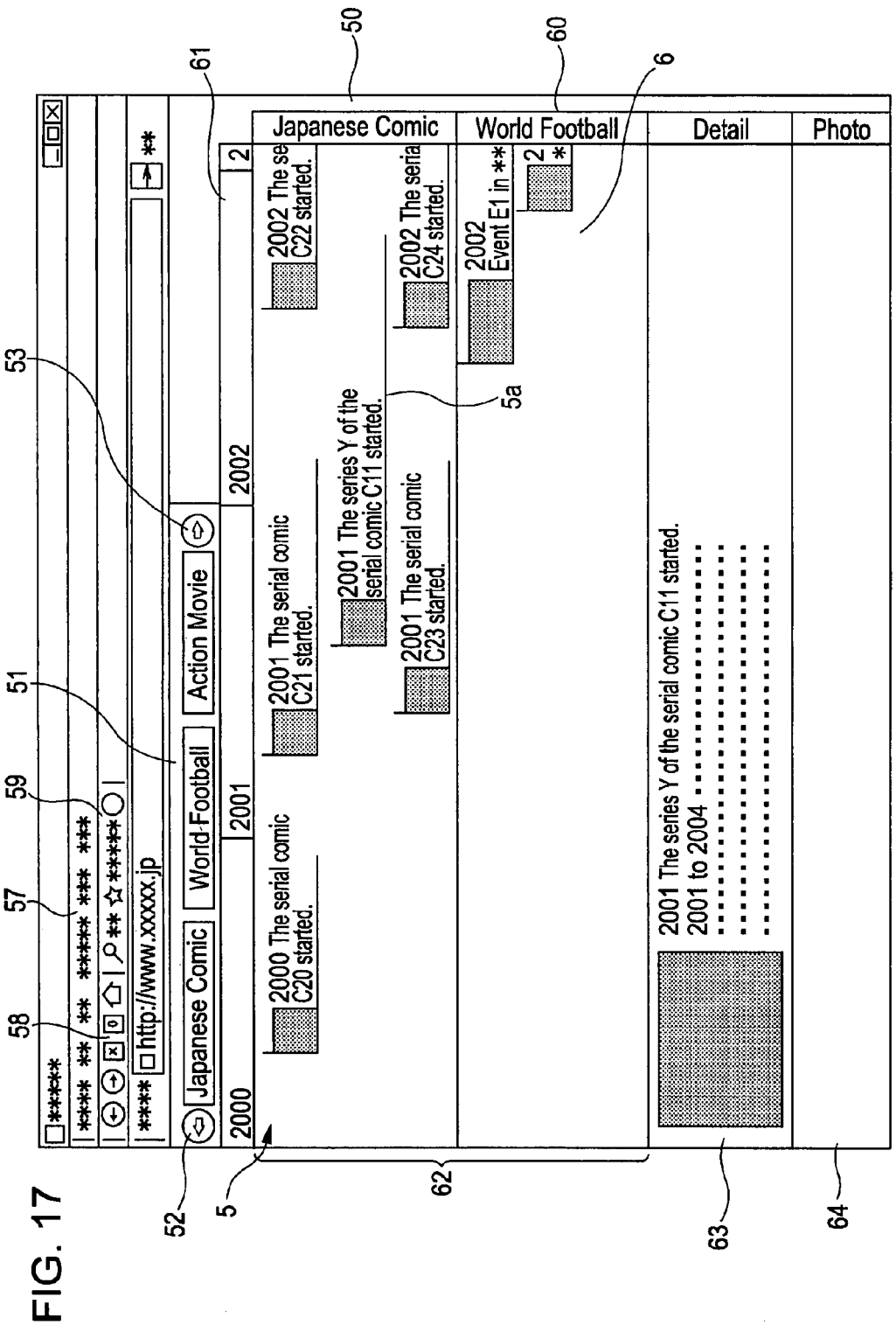
FIG. 17 is an illustration showing an example of a horizontal-display vertical-array multiple chronological table that has been generated.

The chronological table 6 shows a history of football in the world and football in Japan, and FIG. 17 shows a portion of the year 2000 to the year 2002.

Figure 18:
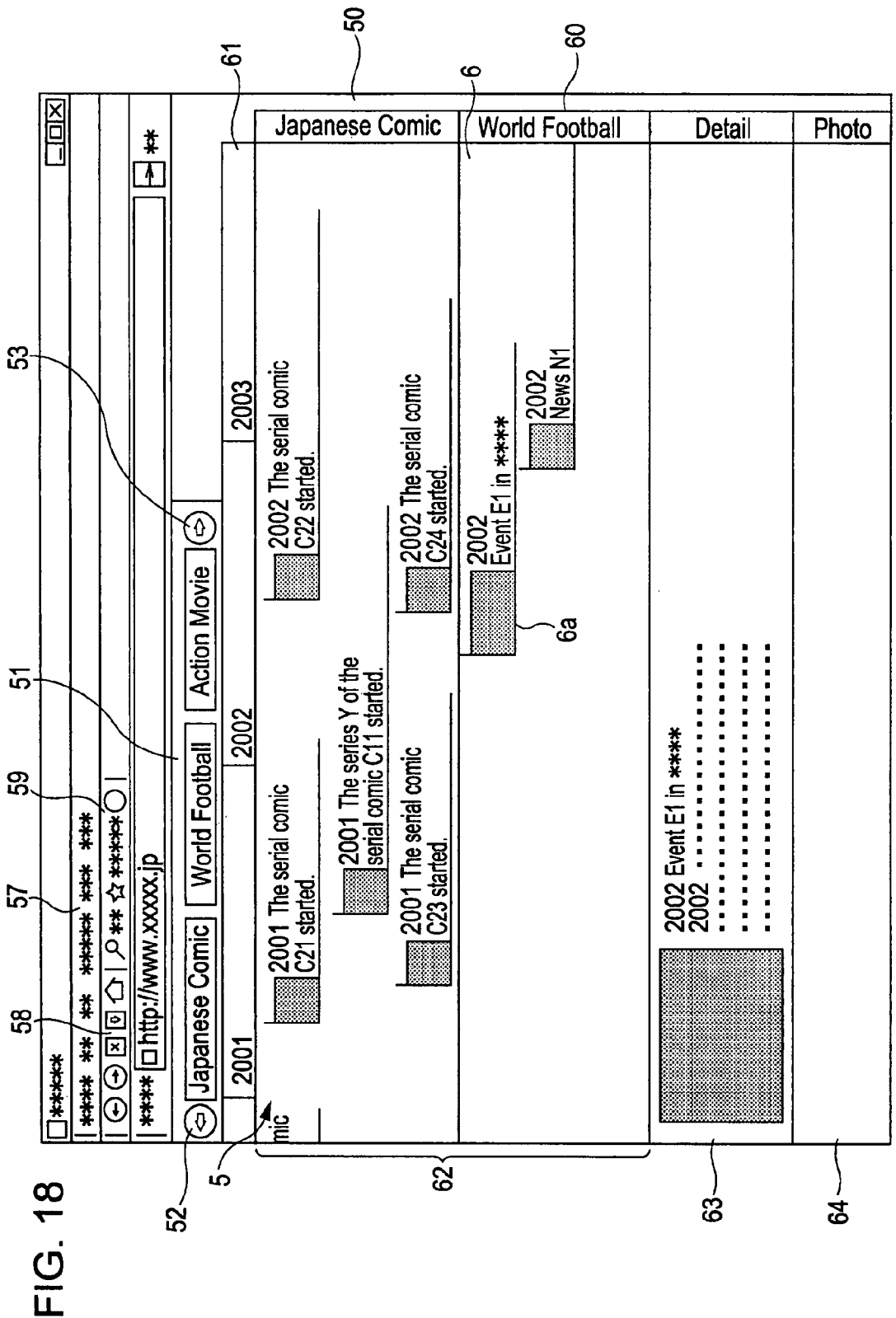
FIG. 18 is an illustration showing an example of a horizontal-display vertical-array multiple chronological table that has been generated.

When the button 53 is operated in this state, for example, portions of the year 2001 to the year 2003 are displayed as the chronological tables 5 and 6, as shown in FIG. 18.

At this time, when a certain event 6a in the chronological table 6 is specified, details (image or description) regarding the specified event 6a are displayed in the region 63.

Figure 19:
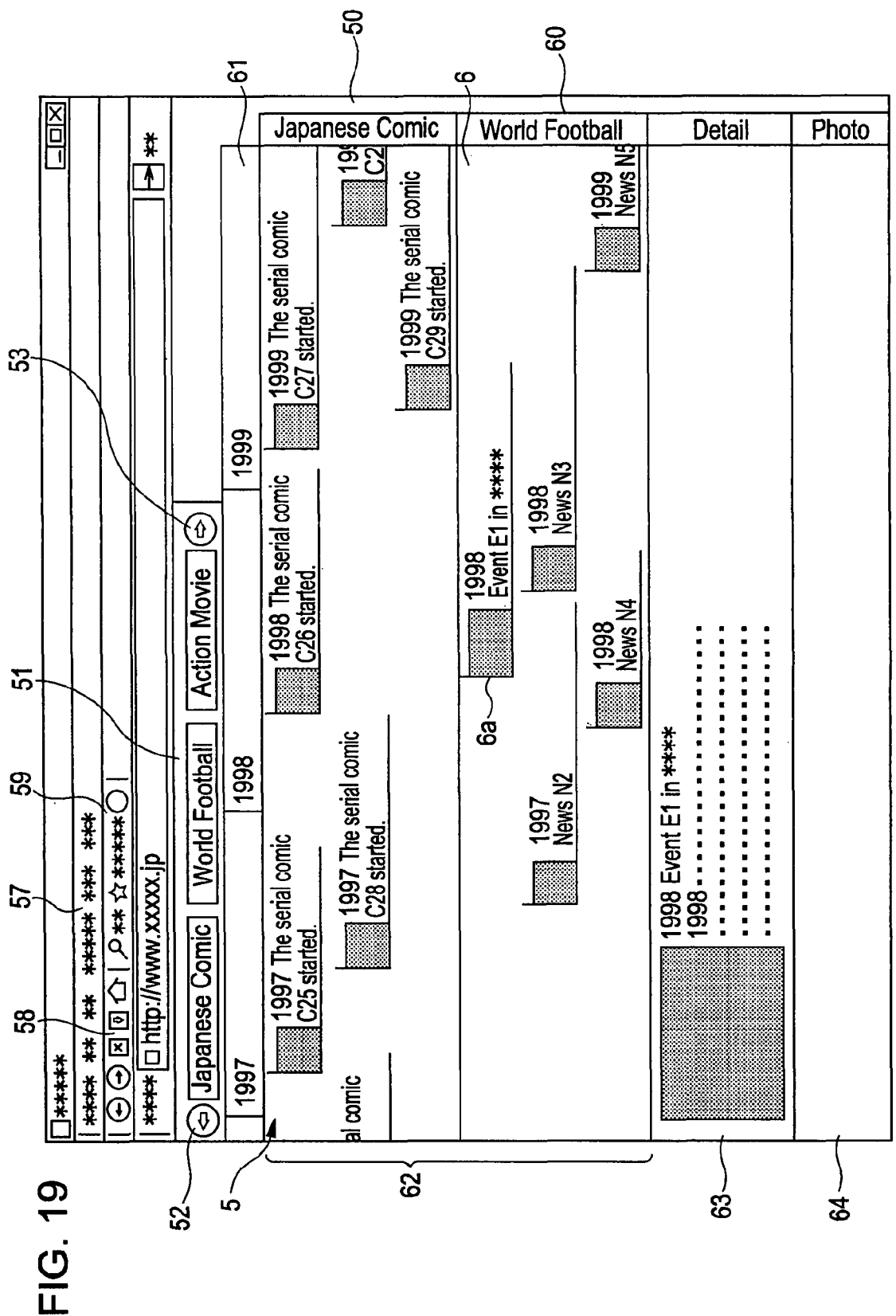
FIG. 19 is an illustration showing an example of a horizontal-display vertical-array multiple chronological table that has been generated.
Figure 20:
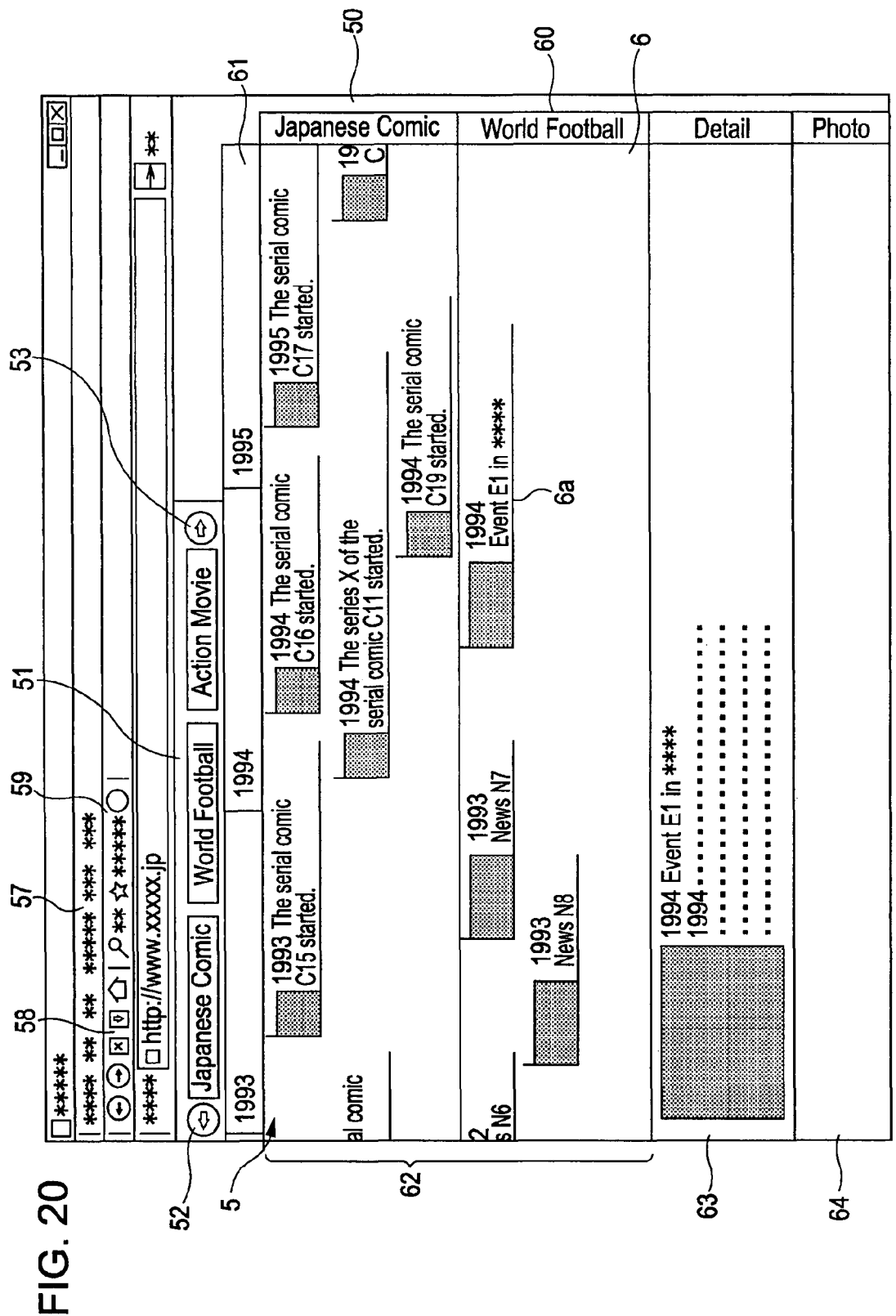
FIG. 20 is an illustration showing an example of a horizontal-display vertical-array multiple chronological table that has been generated.
Figure 21:
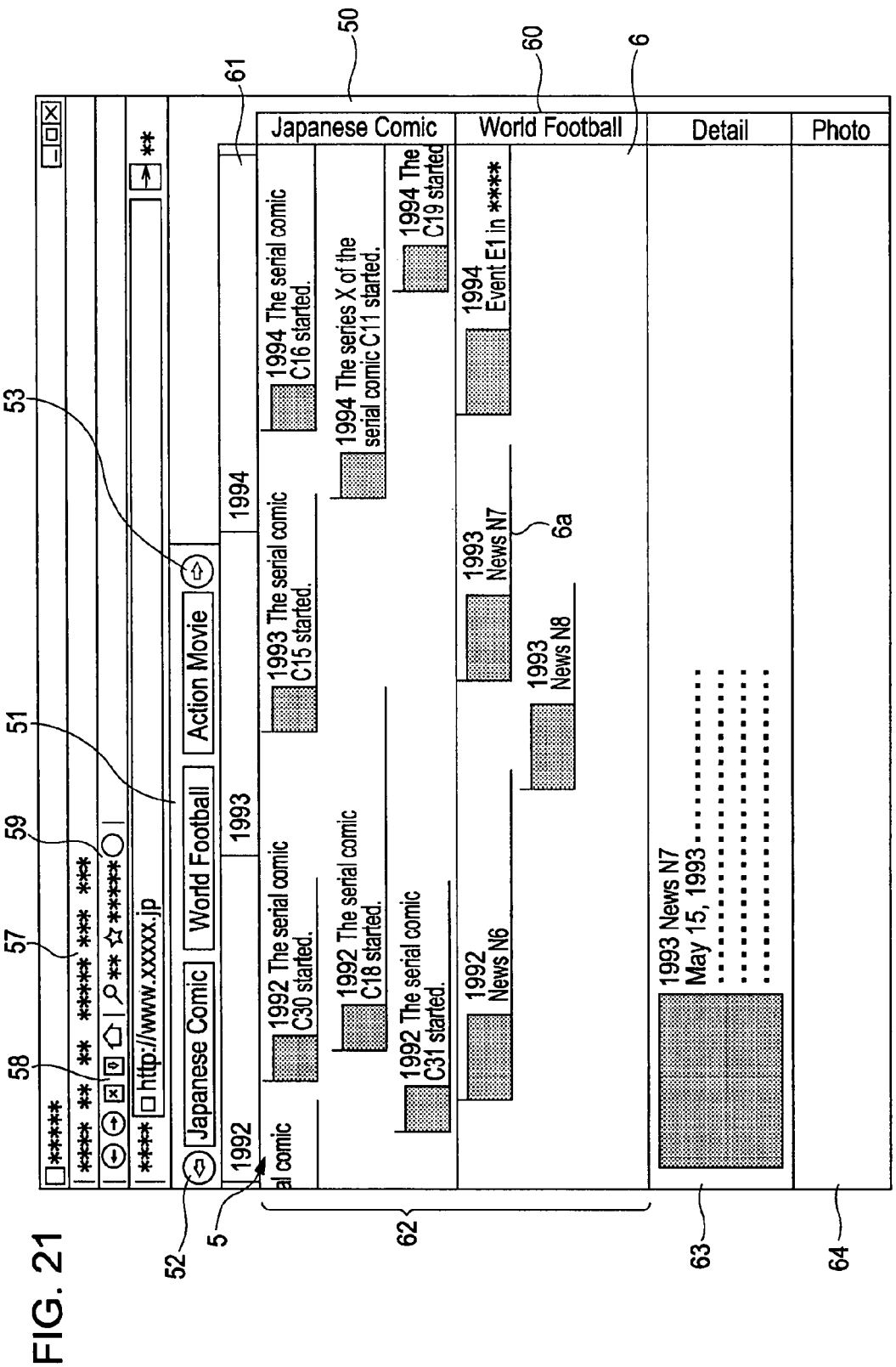
FIG. 21 is an illustration showing an example of a horizontal-display vertical-array multiple chronological table that has been generated.

When the button 52 is operated at this time, for example, portions of the year 1997 to the year 1999 are displayed as the chronological tables 5 and 6, as shown in FIG. 19. When the button 52 is operated further, for example, portions of the year 1993 to the year 1995 are displayed as the chronological tables 5 and 6, as shown in FIG. 20. When the button 52 is operated even further, for example, portions of the year 1992 to the year 1994 are displayed as the chronological tables 5 and 6, as shown in FIG. 21.

Also in the states 19, 20, and 21, the details regarding the specified event 6a in the chronological table 6 are displayed in the region 63.

Figure 22:
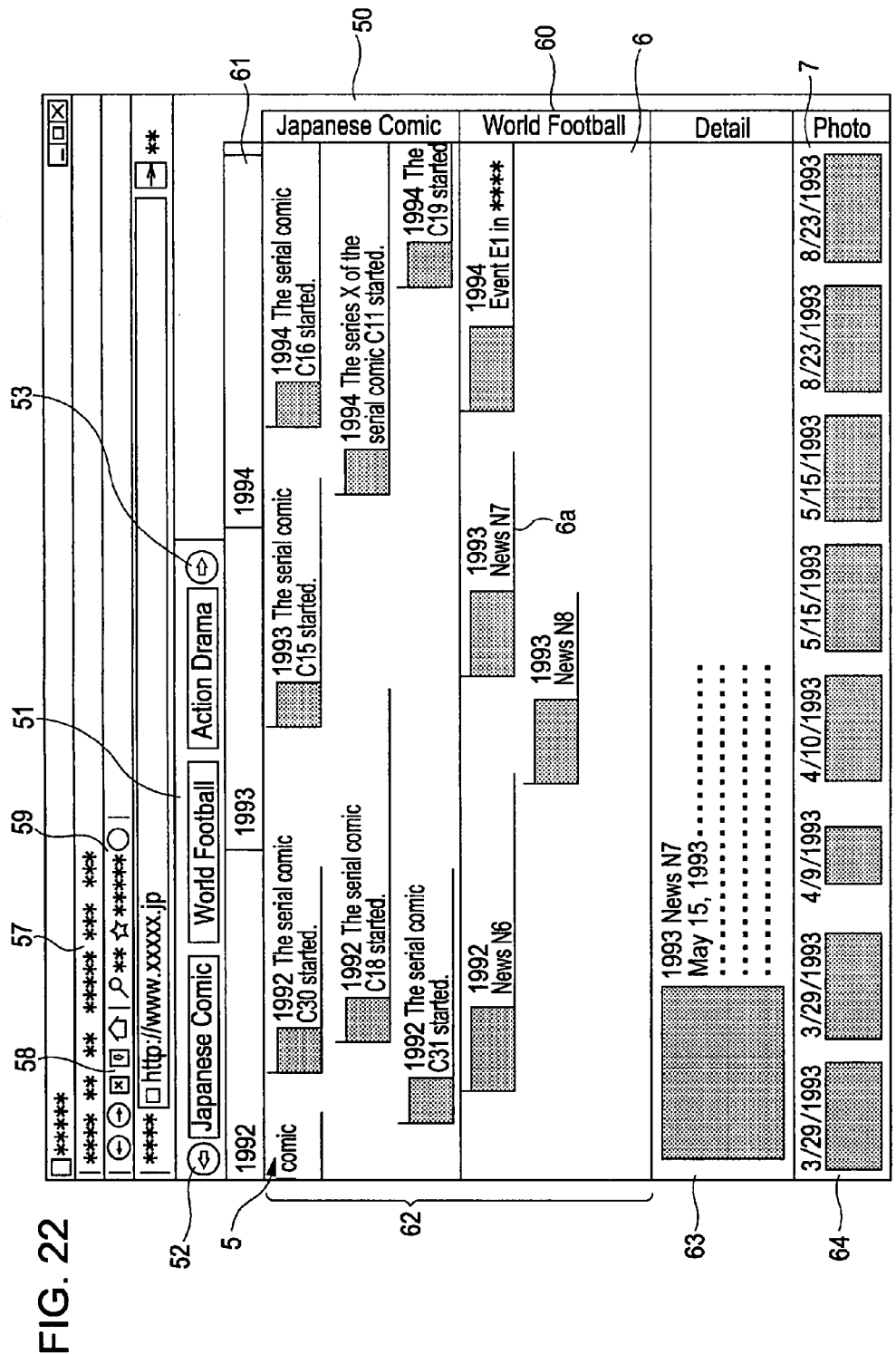
FIG. 22 is an illustration showing an example of a horizontal-display vertical-array multiple chronological table with a chronological table of picture images attached.
Figure 23:
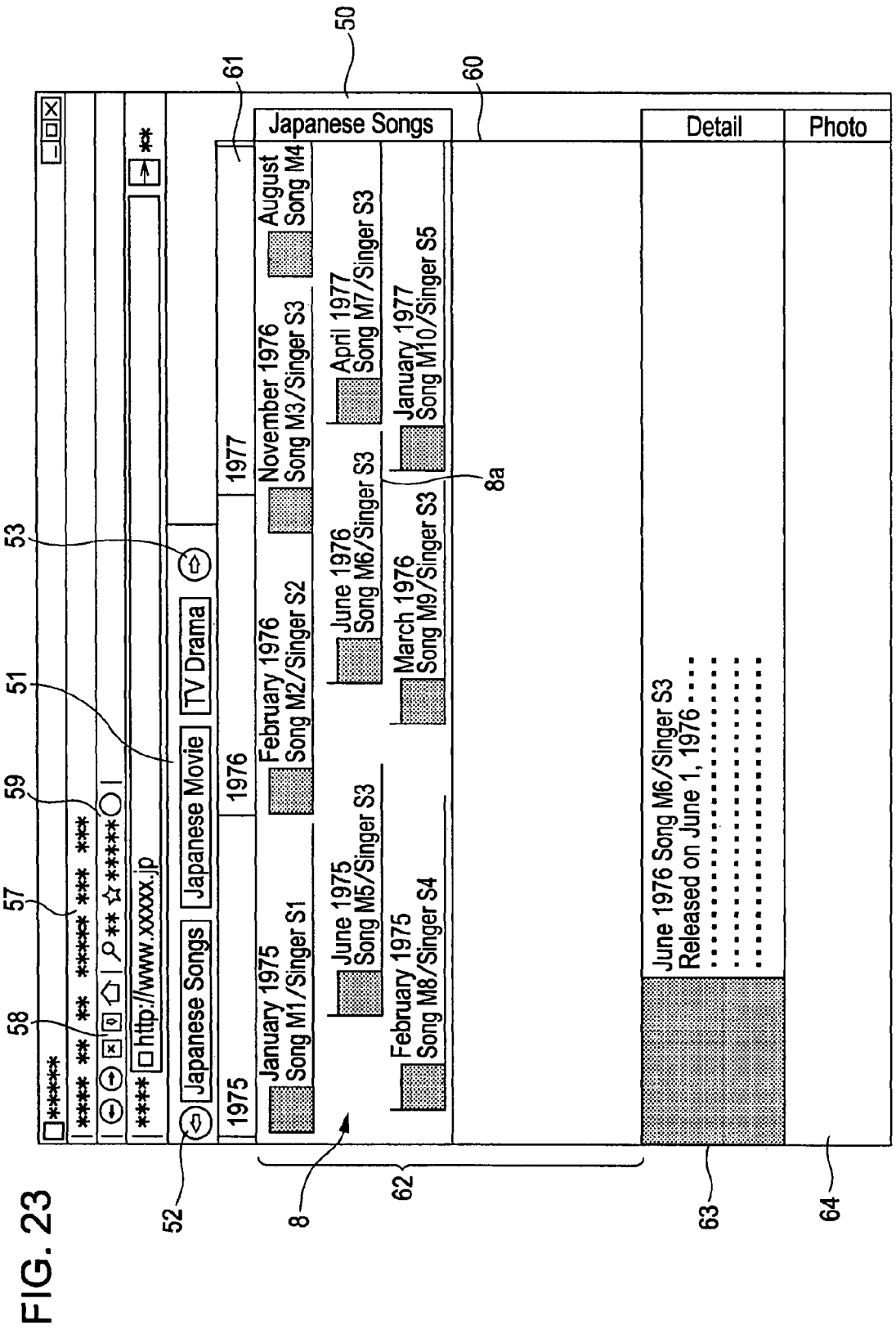
FIG. 23 is an illustration showing an example of a step in generation of a horizontal-display vertical-array multiple chronological table.
Figure 24:
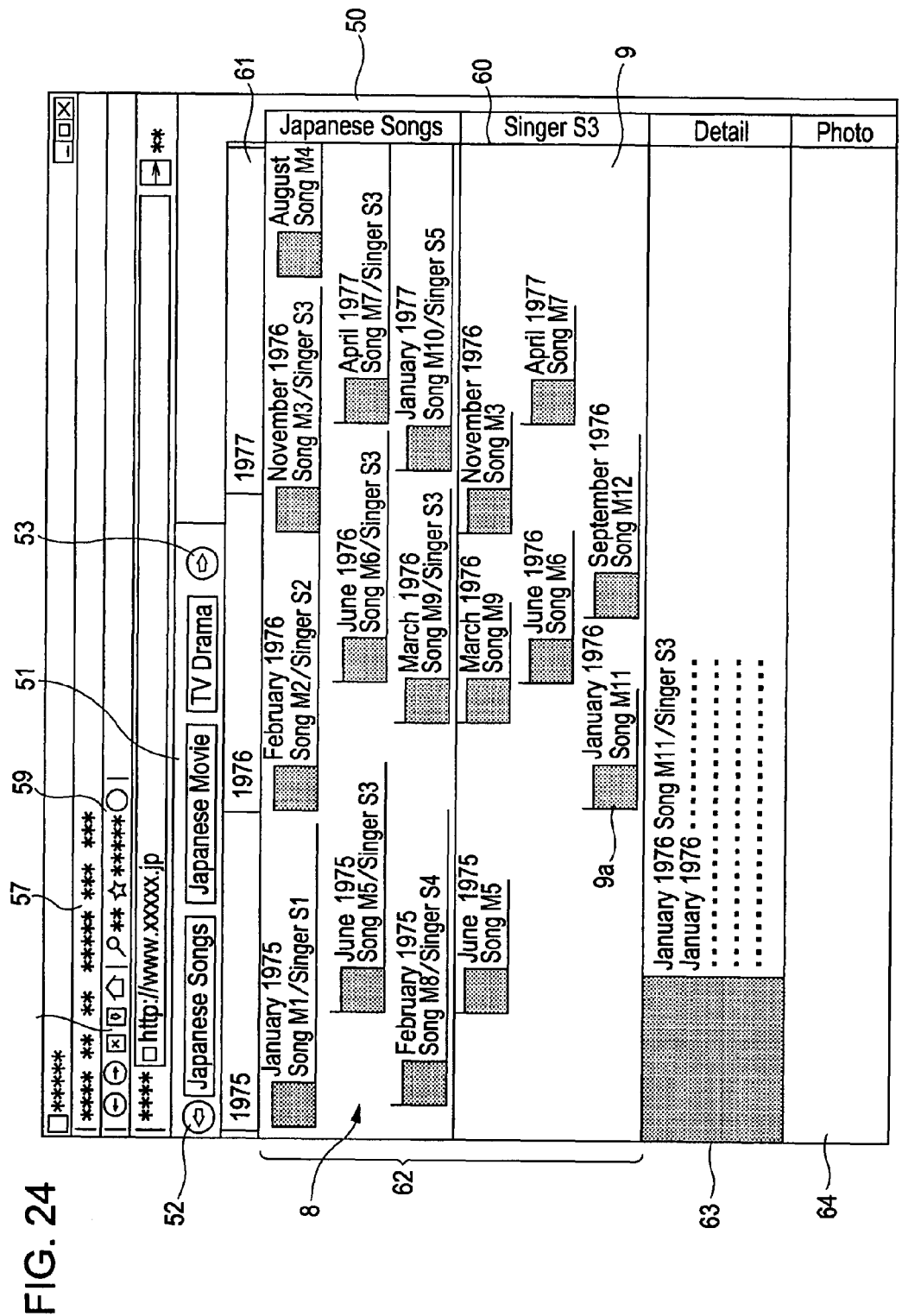
FIG. 24 is an illustration showing an example of a horizontal-display vertical-array multiple chronological table that has been generated.

Editing of a Multiple Chronological Table (FIGS. 22 to 24)

Also in the case of the horizontal-display vertical-array multiple chronological table described above, the following types of editing may be allowed.

(a) Rearrangement of a Multiple Chronological Table

In the case of the example described above, the two chronological tables 5 and 6 are exchanged so that the chronological table 6 ("World Football") is laid out and displayed in the upper region of the region 62, and the chronological table 5 ("Japanese Comic") is laid out and displayed in the lower region of the region 62.

(b) Replacement of Chronological Tables

For example, in the state shown in FIG. 21, the chronological table 5 ("Japanese Comic") is closed, and a chronological table with a title of "Action Movie" is selected and is laid out and displayed in the upper region of the region 62.

(c) Setting or Changing of the Number of Chronological Tables That can be laid out In the case of the example described above, the number of chronological tables that can be laid out in the region 62 or the number of chronological tables that can be laid out in the chronological-table generating area 60 is set or changed within a predetermined range.

(d) Setting or Changing the Display Width of Each Chronological Table

In the case of the example described above, the display width (in the vertical direction of the screen) of the upper region and the lower region of the region 62, the region 63, and the region 64 is set or changed within a predetermined range.

(e) Conversion of the Array Mode

The array mode is changed from the horizontal-display vertical-array mode to the vertical-display horizontal-array mode.

Furthermore, for example, in the state shown in FIG. 21, the user may be allowed to select a plurality of files of picture image files saved in the internal storage device 13 or the local storage 25 as a folder for a chronological table so that the CPU 11 lays out and displays the picture images of the individual files in the folder as one chronological table 7 in the region 64, as shown in FIG. 22.

Furthermore, for example, when chronological tables with titles of "Japanese Songs", "Japanese Movie", and "TV Drama" are provided at the Web site as shown in FIG. 23, chronological tables may be laid out and displayed in the following manner. When the user first selects the chronological table with the title of "Japanese Songs", a corresponding chronological table 8 is laid out and displayed in the upper region similarly to the region 62 in the example described above, and details regarding a specified event 8a in the chronological table 8 are displayed in the region 63 similarly to the example described above. Furthermore, by accessing another Web site according to an operation by the user, various chronological tables provided at the Web site are presented on a screen partially overlapping the chronological-table generating screen 50. When the user selects one of the chronological tables, the selected chronological tables is laid out and displayed in the lower region of the region 62.

FIG. 24 shows a case where the user selects a chronological table with a title of "Singer S3" and a corresponding chronological table 9 is laid out and displayed in the lower region of the region 62, and details regarding a specified event 9a in the chronological table 9 are displayed in the region 63. "Singer S3" is a singer that also appears in the chronological table 8 ("Japanese Songs").

Chronological-Table Generating Process and Saving of a Multiple Chronological Table The chronological-table generating process executed by the CPU 11 of the information processing apparatus 10 when a horizontal-display vertical-array multiple chronological table is as described above, and is the same as the chronological-table generating process shown in FIG. 11 except in that the display menu (chronological axis and chronological table) in the case of generating a vertical-display horizontal-array multiple chronological table is replaced by chronological tables.

The saving of a multiple chronological table that has been generated and retrieval and editing of the saved multiple chronological table are also the same as in the case of the vertical-display horizontal-array multiple chronological table.

3. Other Embodiments 3-1. Obtainment of a Chronological Table

The embodiment described above mainly relates to a case where a multiple chronological table is generated by obtaining chronological tables selected by the user from chronological tables (chronological-table data) exiting on the Internet 100 as an external network. However, a multiple chronological table can be generated by obtaining chronological tables selected by the user from locally existing chronological tables (chronological-table data).

In this case, in the system of the example shown in FIG. 1, various chronological tables recorded in the internal storage device 13 or the local storage 25 are presented in a chronological-table generating screen so that the user can select a chronological table therefrom.

3-2. Content

In a case where pieces of content, such as music or movies, are indicated as events in chronological tables, if data of the content exists on an external network or exists locally, when the user specifies the events, the CPU 11 obtains corresponding content data so that the content can be played back.

The content in this case is, for example, audio data such as music, moving images or still images such as movies or pictures, game programs, or electronic books.

3-3. Chronological Axis

In the embodiment described above, chronological tables showing decades, calendar years, or years and months as chronological axes are generated. However, without limitation to chronological tables, the present invention can be applied to cases where tables showing events in certain periods at corresponding positions on chronological axes.

More specifically, the following chronological axes may be used.

(a) Chronological axis showing a century, such as the 19th century, the 20th century, or the 21st century (b) Chronological axis showing a decade, a calendar year, or a year and month as in the example described above (c) Chronological axis showing a date, hour, and minute, or even second (d) Other types of periods Examples of chronological axes showing other types of periods include a chronological axis representing ordinal numbers, periods, and places of events that were held regularly, e.g., once in four years, such as "First, July 1955, France; Second, June, 1959, Britain; Third, 1963, Germany", or a chronological axis representing a period including a plurality of frames or a plurality of samples as "First frame, Second frame, Third frame" or "First sample, Second sample, Third sample". Also, a weekly chronological axis or a seasonal chronological axis may be used.

It should be understood by those skilled in the art that various modifications, combinations, sub-combinations and alterations may occur depending on design requirements and other factors insofar as they are within the scope of the appended claims or the equivalents thereof.

What is claimed is:

1. A method of generating a plurality of chronological tables such that data for a plurality of topics having time or period information is laid out at corresponding positions along a chronological axis of the plurality of chronological tables, the method comprising:

displaying a chronological table generating screen including a chronological table generating area;

displaying, in the chronological table generating area, at least one display element that is the chronological axis for the plurality of chronological tables, the at least one display element identifying a unit of time by which the data will be arranged along the chronological axis;

obtaining at least one piece of data for each of the plurality of chronological tables; and generating the plurality of chronological tables by laying out, for each chronological table, the at least one piece of data in the chronological table generating area in a corresponding area designated for the chronological table and along the chronological axis at positions based on time and/or period information of each of the at least one piece of data and on the unit of time of the chronological axis, the laying out comprising aligning on the chronological axis a first position of a first piece of data of a first chronological table and a second position of a second piece of data of a second chronological table when the first piece of data and the second piece of data have similar time and/or period information, wherein each chronological table of the plurality of chronological tables relates to a particular topic of the plurality of topics and wherein, for each of the plurality of chronological tables, the at least one piece of data for the chronological table relates to the particular topic of the chronological table.

2. The method according to claim 1, further comprising:
rearranging the plurality of chronological tables laid out in the table generating area, each of the plurality of chronological tables sharing the chronological axis.

3. The method according to claim 1, further comprising:
laying out at least one second piece of data, obtained separately from the at least one piece of data, in the chronological table generating area in place of one, some, or all chronological tables laid out in the chronological table generating area.

4. The method according to claim 1, further comprising:
changing a mode of array of at least one chronological table of the plurality of chronological tables laid out in the chronological table generating area between a horizontal-array mode in which the at least one chronological table and the at least one piece of data of the at least one chronological table and the chronological axis are arrayed in a horizontal direction and a vertical-array mode in which the at least one chronological table and the at least one piece of data of the at least one chronological table and the chronological axis are arrayed in a vertical direction.

5. The method according to claim 1, further comprising:
setting a number of chronological tables that are allowed to be laid out in the chronological table generating area along the chronological axis.

6. The method according to claim 1, further comprising:
setting a display width for each chronological table that will be displayed in the chronological table generating area.

7. The method according to claim 1, further comprising:
if data laid out in the chronological table generating area and specified by a user relates to content data, obtaining and playing back the content data.

8. The method of claim 1, wherein displaying the at least one display element that is the chronological axis is performed in response to receiving a first instruction from a user and obtaining the at least one piece of data is performed in response to receiving a second instruction from a user, the first instruction and the second instruction being different instructions received at different times.

9. An information processing apparatus for generating a plurality of chronological tables in which data for a plurality of topics having time or period information is laid out at corresponding positions along a chronological axis of the plurality of chronological tables, the information processing apparatus comprising:
operation input means for accepting input from a user regarding at least one operation to be performed;
processing means for displaying a chronological table generating screen including a chronological table generating area and displaying at least one display element that is the chronological axis for the plurality of chronological tables, the at least one display element identifying a unit of time by which the data will be arranged along the chronological axis; and
controlling means for obtaining at least one piece of data for each of the plurality of chronological tables and generating the plurality of chronological tables by laying out the at least one piece of data in the chronological table generating area in a corresponding area designated for the chronological table and at positions along the chronological axis based on time or period information of each of the at least one piece of data and on the unit of time of the chronological axis, the laying out comprising aligning on the chronological axis a first position of a first piece of data of a first chronological table and a second position of a second piece of data of a second chronological table when the first piece of data and the second piece of data have similar time and/or period information,
wherein each chronological table of the plurality of chronological tables relates to a particular topic of the plurality of topics and wherein, for each of the plurality of chronological tables, the at least one piece of data for the chronological table relates to the particular topic of the chronological table.

10. The information processing apparatus according to claim 9,
wherein the controlling means rearranges the plurality of chronological tables laid out in the table generating area, according to an operation of the operation input means.

11. The information processing apparatus according to claim 9,
wherein the controlling means lays out at least one second piece of data, obtained separately from the at least one piece of data, in the chronological table generating area in place of one, some, or all chronological tables laid out in the chronological table generating area, according to an operation of the operation input means.

12. The information processing apparatus according to claim 9,
wherein the controlling means changes a mode of array of at least one chronological table of the plurality of chronological tables laid out in the chronological table generating area between a horizontal-array mode in which the at least one chronological table and the at least one piece of data of the at least one chronological table and the chronological axis are arrayed in a horizontal direction and a vertical-array mode in which the at least one chronological table and the at least one piece of data of the at least one chronological table and the chronological axis are arrayed in a vertical direction, according to an operation of the operation input means.

13. The information processing apparatus according to claim 9,
wherein the controlling means sets a number of chronological tables that are allowed to be laid out in the chronological table generating area, according to an operation of the operation input means.

14. The information processing apparatus according to claim 9,
wherein the controlling means sets a display width for each chronological table that will be displayed in the chronological table generating area, according to an operation of the operation input means.

15. A storage device having recorded thereon a chronological table generating program for generating a plurality of chronological tables in which data for a plurality of topics having time or period information is laid out at corresponding positions along a chronological axis of the plurality of chronological tables, the table generating program causing a computer to function as:
processing means for displaying a chronological table generating screen including a chronological table generating area and displaying at least one display element that is the chronological axis of the plurality of chronological tables, the at least one display element identifying a unit of time by which the data will be arranged along the chronological axis; and
controlling means for obtaining at least one piece of data for each of the plurality of chronological tables and for generating the plurality of chronological tables by laying out the at least one piece of data in the chronological table generating area in a corresponding area designated for the chronological table and at positions along the chronological axis based on time and/or period information of each of the at least one piece of data and on the unit of time of the chronological axis, the laying out comprising aligning on the chronological axis a first position of a first piece of data of a first chronological table and a second position of a second piece of data of a second chronological table when the first piece of data and the second piece of data have similar time and/or period information,
wherein each chronological table of the plurality of chronological tables relates to a particular topic of the plurality of topics and wherein, for each of the plurality of chronological tables, the at least one piece of data for the chronological table relates to the particular topic of the chronological table.

16. An information processing apparatus for generating a plurality of chronological tables in which data having time or period information is laid out at corresponding positions along a chronological axis, the information processing apparatus comprising:
  an operation input unit;
  a processor configured to display a chronological table generating screen including a chronological table generating area and to display at least one display element that is the chronological axis of the plurality of chronological tables, the at least one display element identifying a unit of time by which the data will be arranged along the chronological axis; and
  a controller configured to obtain at least one piece of data for each of the plurality of chronological tables and to generate the plurality of chronological tables by laying out the at least one piece of data in the chronological table generating area in a corresponding area designated for the chronological table and at positions along the chronological axis based on time or period information of each of the at least one piece of data and on the unit of time of the chronological axis, the laying out comprising aligning on the chronological axis a first position of a first piece of data of a first chronological table and a second position of a second piece of data of a second chronological table when the first piece of data and the second piece of data have similar time and/or period information,
  wherein each chronological table of the plurality of chronological tables relates to a particular topic of the plurality of topics and wherein, for each of the plurality of chronological tables, the at least one piece of data for the chronological table relates to the particular topic of the chronological table.

17. A storage device having recorded thereon a chronological table generating program for generating a plurality of chronological tables in which data having time or period information is laid out at corresponding positions along a chronological axis of the plurality of chronological tables, the table generating program causing a computer to function as:
  a processor configured to display a chronological table generating screen including a chronological table generating area and to display at least one display element that is the chronological axis of the plurality of chronological tables, the at least one display element identifying a unit of time by which the data will be arranged along the chronological axis; and
  a controller configured to obtain at least one piece of data for each of the plurality of chronological tables and to generate the plurality of chronological tables by laying out the at least one piece of data in the chronological table generating area in a corresponding area designated for the chronological table and at positions along the chronological axis based on time or period information of each of the at least one piece of data and on the unit of time of the chronological axis, the laying out comprising aligning on the chronological axis a first position of a first piece of data of a first chronological table and a second position of a second piece of data of a second chronological table when the first piece of data and the second piece of data have similar time and/or period information,
  wherein each chronological table of the plurality of chronological tables relates to a particular topic of the plurality of topics and wherein, for each of the plurality of chronological tables, the at least one piece of data for the chronological table relates to the particular topic of the chronological table.

* * * * *